United States Patent
Foody

(10) Patent No.: US 9,447,353 B2
(45) Date of Patent: *Sep. 20, 2016

(54) PIPELINE ARRANGEMENT FOR UTILIZING A GAS COMPRISING BIOMETHANE

(71) Applicant: IOGEN CORPORATION, Ottawa (CA)

(72) Inventor: Patrick J. Foody, Ottawa (CA)

(73) Assignee: Iogen Corporation, Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/017,510

(22) Filed: Feb. 5, 2016

(65) Prior Publication Data

US 2016/0245512 A1 Aug. 25, 2016

Related U.S. Application Data

(63) Continuation of application No. 14/974,620, filed on Dec. 18, 2015, which is a continuation-in-part of application No. 14/973,361, filed on Dec. 17, 2015, which is a continuation of application No. 14/719,085, filed on May 21, 2015, now Pat. No. 9,222,048.

(60) Provisional application No. 62/119,358, filed on Feb. 23, 2015, provisional application No. 62/216,754, filed on Sep. 10, 2015.

(51) Int. Cl.

| G05B 21/00 | (2006.01) |
|---|---|
| C10L 3/06 | (2006.01) |
| C10L 1/04 | (2006.01) |

(Continued)

(52) U.S. Cl.
CPC .. *C10L 3/06* (2013.01); *C10L 1/04* (2013.01); *C10L 3/10* (2013.01); *F17D 3/10* (2013.01); *F17D 3/12* (2013.01); *F23K 5/10* (2013.01); *G06Q 30/018* (2013.01); *C10L 2200/0469* (2013.01); *C10L 2270/10* (2013.01); *C10L 2290/24* (2013.01); *C10L 2290/58* (2013.01);

(Continued)

(58) Field of Classification Search
None
See application file for complete search history.

(56) References Cited

U.S. PATENT DOCUMENTS

| 7,240,499 B1 | 7/2007 | Shivers | |
|---|---|---|---|
| 7,731,779 B2 * | 6/2010 | Palumbo | B01D 53/047 95/143 |

(Continued)

FOREIGN PATENT DOCUMENTS

WO 2008097304 A1 8/2008

OTHER PUBLICATIONS

Foody, "A New Approach to Generate RINs with BIOGAS", Presentation at 17th Annual LMOP Conference, Baltimore, MD, Jan. 21-23, 2014.

(Continued)

*Primary Examiner* — Sean Shechtman
(74) *Attorney, Agent, or Firm* — Knobbe Martens Olson & Bear LLP

(57) ABSTRACT

Embodiments of the invention provide a process in which a gas comprising biomethane having a heating value of less than about 925 BTU/cubic foot is introduced to a pipeline system that is connected to at least one source of natural gas having a heating value of at least about 950 BTU/cubic foot. The gas comprising biomethane combines with natural gas in the pipeline system to produce a mixed gas having a heating value below about 925 BTU/cubic foot. An amount of natural gas at least equal to the amount of gas comprising biomethane is withdrawn from the pipeline system for use as a transportation fuel, a fuel intermediate or as a feedstock for producing a fuel. The process can enable fuel credit generation and/or reductions in life cycle greenhouse gas emissions.

15 Claims, 1 Drawing Sheet

(51) Int. Cl.
 C10L 3/10 (2006.01)
 F17D 3/10 (2006.01)
 F17D 3/12 (2006.01)
 G06Q 50/30 (2012.01)
 F23K 5/10 (2006.01)
 G06Q 30/00 (2012.01)

(52) U.S. Cl.
 CPC ...... C10L 2290/60 (2013.01); F23K 2301/103 (2013.01); G06Q 50/30 (2013.01)

(56) References Cited

U.S. PATENT DOCUMENTS

| | | |
|---|---|---|
| 8,176,931 B1 | 5/2012 | Cajiga et al. |
| 8,658,026 B2 | 2/2014 | Foody et al. |
| 8,753,854 B2 | 6/2014 | Foody |
| 8,945,373 B2 | 2/2015 | Foody |
| 9,222,048 B1 * | 12/2015 | Foody .................. C10L 3/06 |
| 2003/0188863 A1 | 10/2003 | Gilbert et al. |
| 2006/0213370 A1 | 9/2006 | Leonard et al. |
| 2008/0134754 A1 | 6/2008 | Funk |
| 2009/0107913 A1 | 4/2009 | Johnson |
| 2012/0090325 A1 | 4/2012 | Lewis |
| 2013/0225885 A1 | 8/2013 | Foody et al. |
| 2014/0043932 A1 | 2/2014 | Russell et al. |
| 2014/0222698 A1 | 8/2014 | Potdar et al. |
| 2014/0242659 A1 | 8/2014 | Foody |
| 2015/0011009 A1 | 1/2015 | Schmidt et al. |

OTHER PUBLICATIONS

Landfill Methane Outreach Program, LFG Energy Project Development Handbook, Feb. 18, 2015.
Scholwin et al., "Biomethane injection and synergies between natural gas and biomethane", Presentation at EGATEC Conference May 12, 2011.
Johnston, Marsha, "Breaking Down Renewable Natural Gas Injection Barriers", BioCycle, Sep. 2014, 60-65.
International Search Report and Written Opinion dated Apr. 26, 2016 in International Application No. PCT/CA2016/050136, filed on Feb. 16, 2016.

* cited by examiner

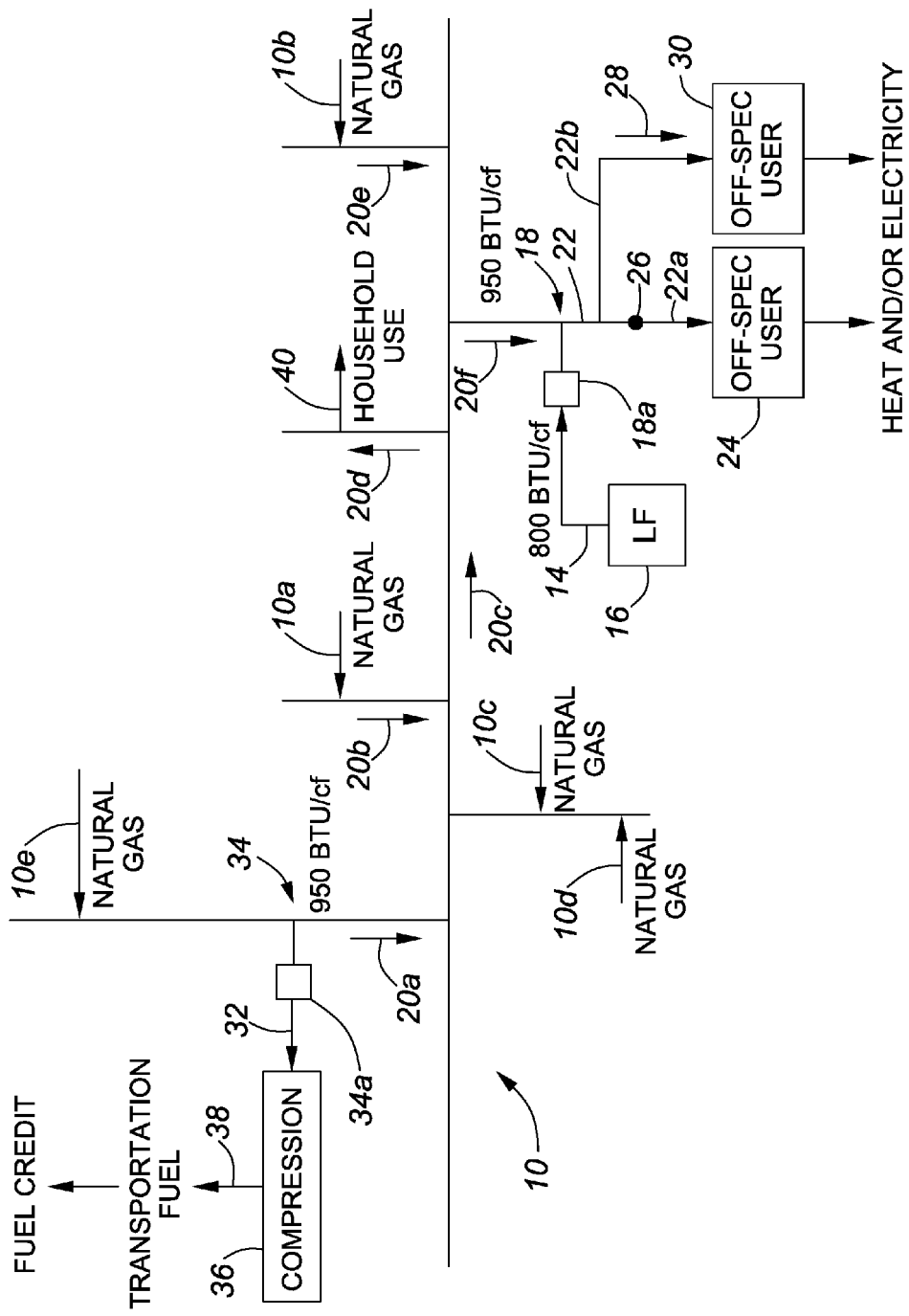

PIPELINE ARRANGEMENT FOR UTILIZING A GAS COMPRISING BIOMETHANE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD OF THE INVENTION

The present invention relates to a process for producing a transportation fuel using a gas comprising biomethane in a pipeline arrangement.

BACKGROUND OF THE INVENTION

Biogas is a biofuel produced by anaerobic digestion that has been receiving increased attention in recent years. Biogas contains predominantly biomethane and is commonly used as heating fuel or for electricity generation, although it can potentially also be used as a transportation fuel or as an intermediate to produce another transportation fuel. A benefit of making biogas is that a wide variety of feedstocks can be used to produce the gas, including landfill waste or waste streams from commercial plants. In the production of ethanol from cellulosic feedstocks, waste streams remaining after the recovery of ethanol are often treated by anaerobic digestion to produce biogas. Landfills also produce biogas through anaerobic digestion of municipal waste. While the biogas is commonly used on-site for heating or electricity generation, for example at a plant or a landfill site, its use is less widespread in the transportation sector. However, commercializing the use of biogas in other applications besides on-site use at a plant or other facility would be desirable.

There are several practical barriers to using biogas off-site as a transportation fuel. For instance, the gas generally needs to be transported from the location where it is made to a location where it can be used as a transportation fuel, which is often remote from the biogas source. The most common and typically least expensive way to transfer methane such long distances is by natural gas pipeline. There are large networks of natural gas pipeline that already exist and using these pipelines saves significant expense associated with building an alternative pipeline dedicated for transporting biogas.

However, prior to introducing a gas comprising biomethane to such pipelines, it is typically required to be purified to pipeline quality specifications. Furthermore, for its use in transportation applications, biomethane must be purified sufficiently so that it is compatible with vehicle engines. The purity of natural gas is often quantified as a heating value in British Thermal Units (BTU)/cubic foot. The higher the heating value, the cleaner the natural gas due to a reduced concentration of non-combustible gases. To introduce natural gas into a pipeline, including from fossil sources, it is typical that pipeline operators require clean-up to meet their specifications, including requiring the input gas to be above a heating value of, for example, 950 BTU/cubic foot. Biogas in its crude form has a low heating value compared to pipeline quality natural gas and thus requires significant purification.

While methods exist for purification of biogas to meet pipeline specifications, or to enable direct use in transportation applications, they are expensive to operate and require significant capital investment. Impurities in biogas include carbon dioxide, hydrogen sulfide, water, oxygen, siloxanes, nitrogen and/or halogenated compounds, depending on its source. Impurity removal from the crude biogas may be carried out by scrubbing techniques such as water or polyethylene glycol scrubbing, which involve flowing biogas through a column with a water or polyethylene glycol solution flowing counter-current to the biogas. A further technique for impurity removal, such as carbon dioxide removal, from the crude biogas is pressure swing absorption, which utilizes adsorptive materials, such as zeolites and activated carbon that preferentially adsorb carbon dioxide at high pressure. When the pressure is released, the carbon dioxide desorbs. Membrane separation is another technique that can be used to remove impurities from the crude biogas. Membrane separation may include high pressure gas separation or gas-liquid absorption membranes. However, each of these techniques requires the use of specialized equipment and/or solvents.

Despite the challenges with commercializing biogas for transportation use, an advantage of using it in such applications is that it enables the generation of valuable fuel credits, which otherwise may not be available if biogas were simply used at a facility for heat or electricity. The utilization of renewable fuels for transportation applications has been promoted by various governments, including the United States government through the Energy Independence and Security Act ("EISA") of 2007. Some of the purposes of the act are to increase the production of clean renewable fuels, to promote research on and deploy greenhouse gas ("GHG") capture and to reduce fossil fuels present in fuels. Valuable fuel credits can be available when transportation fuels have a reduced GHG footprint. However, since fuel credits are generated for biogas in association with its use for transportation, in order to obtain such credits, one must typically incur the capital expense associated with purifying the gas to at least 950 BTU/cubic foot.

Thus, there is a need in the art for a process that can reduce the cost of using methane sourced from biogas for transportation fuel, which in turn can enable the generation of valuable fuel credits with reduced capital cost. Further, there is a need in the art to incentivize the utilization of biogas so as to reduce GHG emissions. The more widespread the use of biogas, the less natural gas methane is utilized, which in turn contributes to lower GHG emissions.

SUMMARY OF THE INVENTION

Embodiments of the invention offer a solution that facilitates the commercial use of biogas by reducing or avoiding the cost of biogas purification to reach a threshold typically required for its introduction to a pipeline.

According to various embodiments of the invention, a first amount of gas comprising biomethane that has a heating value below that required to meet pipeline specifications, generally below about 925 BTU/cubic foot, is combined with a second amount of natural gas having a heating value above about 950 BTU/cubic foot at a point within a pipeline system, referred to herein as a "combination point". This produces a "mixed gas" that has a heating value that is lower than that of the second amount of the natural gas.

For example, according to certain illustrative embodiments of the invention, a gas comprising biomethane that has a heating value below that required to meet pipeline specifications, generally below about 925 BTU/cubic foot, is introduced at a location within a pipeline system carrying natural gas, referred to herein as a "biomethane introduction point." Such biomethane introduction point is at a point where there is natural gas in the pipeline. Introduction of the gas at this location on the pipeline produces a mixed gas downstream of the biomethane introduction point that has a heating value lower than that of the natural gas upstream of the introduction point. In certain embodiments of the invention, gas comprising biomethane is introduced into a pipeline system carrying natural gas and such natural gas is not at the biomethane introduction point but is within the pipeline system. That is, the biomethane introduction point and the point at which the gas comprising biomethane and natural gas combine at the combination point need not coincide. As described herein, natural gas may also be introduced to a pipeline system carrying biogas or gas comprising biomethane. The pipeline system into which gas comprising biomethane is introduced is connected to at least one source of natural gas having a heating value of at least 950 BTU/cubic feet.

The mixed gas produced by any one of the foregoing embodiments is subsequently withdrawn or is caused to be withdrawn downstream of the combination point or biomethane introduction point for use by at least one user who can tolerate gas having a heating value of less than that required to meet pipeline specifications. For example, such a user may mix the gas withdrawn with air and combust the mixture of gas and air to generate heat and/or electricity.

In addition, an amount of natural gas is withdrawn or caused to be withdrawn from the pipeline system, typically at a point that is upstream of the combination point. The amount of natural gas withdrawn is at least substantially equal to the amount of gas comprising biomethane introduced at the combination point or biomethane introduction point. Such amounts are generally quantified as energy delivered as described herein. In some embodiments the natural gas withdrawn is used as a transportation or heating fuel or other fuel that enables the generation of transportation fuel credits.

The natural gas withdrawn is used or caused to be used as a transportation fuel, fuel intermediate, or as a feedstock to produce a transportation fuel. The transportation fuel may replace or reduce the use of fossil derived transportation fuel.

The GHG emission attributes of the gas comprising biomethane may be transferred to the natural gas that is withdrawn. Transfer of the GHG emission attributes to the natural gas can allow for a fuel credit to be generated or caused to be generated.

In certain embodiments, the transfer of GHG emission attributes are evidenced by title transfers. In various embodiments, after the natural gas withdrawal, title is then transferred or caused to be transferred with respect to the gas comprising biomethane to the natural gas withdrawn typically at a location that is upstream of the biomethane introduction point or combination point. Transfer of title may include transferring ownership, including environmental attributes of the gas comprising biomethane from the owner to a user of natural gas withdrawn at the upstream location or an intermediary.

By mixing a gas comprising biomethane having a heating value of less than, for example, about 925 BTU/cubic foot with natural gas at a location or combination point where downstream users are tolerant to natural gas that has a low heating value and by transferring environmental attributes or title associated with the gas comprising biomethane to an owner or different geographical location for use where on-specification natural gas is withdrawn for transportation purposes, costs associated with purification of biogas, in certain embodiments, may be avoided or reduced. Advantageously, a fuel credit can subsequently be generated or caused to be generated with respect to the natural gas withdrawn upstream of the biomethane introduction point or combination point, while still utilizing biogas commercially.

Pipeline specifications for heating values are known and can be readily determined from published values for a particular pipeline or pipeline system by those of skill in the art. Since pipeline specifications can vary depending on the location on a pipeline, a pipeline specification value is measured at the combination point, an introduction point or withdrawal point on a pipeline. For example, whether the heating value of the gas comprising biomethane is below pipeline specifications is determined at its introduction point or combination point with natural gas. Likewise, whether the heating value of mixed gas withdrawn at the downstream location is below pipeline specifications is determined at its withdrawal point; the heating value of natural gas withdrawn typically upstream of the combination point is also determined at the withdrawal point or points. Heating values can be determined as a daily average. When a gas does not meet or is below pipeline specifications, it is typically below a specification heating value by at least about 8%, by at least about 10%, more typically at least about 20%. When a gas meets pipeline specifications, it is equal to or exceeds a specification heating value. According to embodiments of the invention, inputs and outputs to the pipeline are tracked by flow meters and electronic recording.

According to an exemplary aspect of the invention, there is provided a process for producing a transportation fuel comprising:

(i) introducing a gas comprising biomethane to a pipeline system wherein the gas comprising biomethane has a heating value of less than about 925 BTU/cubic foot;

(ii) combining a first amount of the gas comprising biomethane having the heating value of less than about 925 BTU/cubic foot with a second amount of natural gas having a heating value that is greater than that of the gas comprising biomethane by at least about 50 BTU/cubic foot, said combining occurring at a combination point in the pipeline system to produce a mixed gas downstream of the combination point having a heating value less than about 900 BTU/cubic foot;

(iii) measuring a value representing energy content and a value representing a volume of flow of all or a portion of the gas comprising biomethane in steps (i) or (ii);

(iv) from the values measured in step (iii), obtaining and recording a value representing energy delivered for the gas comprising biomethane in one or more time periods;

(v) withdrawing or causing the withdrawal of a third amount of natural gas from the pipeline system, said third amount of withdrawn natural gas being withdrawn at one or more withdrawal locations in the pipeline system that are upstream of said combination point, wherein the withdrawn natural gas has an average heating value that is greater than the heating value for the gas comprising biomethane by at least about 50 BTU/cubic foot;

(vi) measuring or causing a measurement of the volume of flow of the withdrawn natural gas at said one or more withdrawal locations in step (v), wherein a value representing the volume of flow is recorded for the withdrawn natural gas at said one or more withdrawal locations, and the value of the energy delivered for the third amount of withdrawn natural gas is at least equal to the value of the energy delivered for the gas comprising biomethane in step (iv);

(vii) using or causing the use of the withdrawn natural gas measured in step (vi) as a transportation fuel, or as a fuel intermediate or a feedstock to produce a transportation fuel; and (viii) generating or causing the generation of a fuel credit.

According to a further exemplary aspect of the invention, there is provided a process for producing a transportation fuel comprising:

(i) introducing or causing the introduction of a gas comprising biomethane having a heating value of less than about 925 BTU/cubic foot into a pipeline system;

(ii) combining or causing the combination of a first amount of the gas comprising biomethane having the heating value of less than about 925 BTU/cubic foot with a second amount of natural gas having a heating value that is greater than that of the gas comprising biomethane by at least about 50 BTU/cubic foot, said combining or combination occurring at a combination point in the pipeline system to produce a mixed gas downstream of the combination point having a heating value less than about 925 BTU/cubic foot;

(iii) measuring or causing a measurement of a value representing energy content and a value representing a volume of flow of all or a portion of the gas comprising biomethane in steps (i) or (ii);

(iv) from the values measured in step (iii), obtaining a value representing energy delivered for the gas comprising biomethane in one or more time periods;

(v) withdrawing or causing the withdrawal of a third amount of natural gas from the pipeline system, said third amount of withdrawn natural gas being withdrawn at one or more withdrawal locations in the pipeline system to which the mixed gas does not flow, wherein the withdrawn natural gas has an average heating value that is greater than the heating value for the gas comprising biomethane by at least about 50 BTU/cubic foot;

(vi) measuring or causing a measurement of the volume of flow of the withdrawn natural gas at said one or more withdrawal locations in step (v), wherein a value representing the volume of flow is recorded for the withdrawn natural gas at said one or more withdrawal locations, and the value of the energy delivered for the third amount of withdrawn natural gas is at least equal to value of the energy delivered for the gas comprising biomethane in step (iv);

(vii) using or causing the use of the withdrawn natural gas measured in step (vi) as a transportation fuel, or as a fuel intermediate or a feedstock to produce a transportation fuel; and (viii) generating a fuel credit.

According to a further exemplary aspect of the invention, there is provided a process for producing a transportation fuel comprising:

(i) introducing or causing the introduction of a first amount of a gas comprising biomethane having a heating value in the range of about 350 BTU/cubic foot to about 925 BTU/cubic foot into a pipeline system or a pipeline connected to the pipeline system, said pipeline system connected to at least one source of natural gas having a heating value of at least about 950 BTU/cubic foot, wherein the gas comprising biomethane combines with the natural gas to produce a mixed gas having a heating value less than about 900 BTU/cubic foot;

(ii) measuring or causing the measurement of a value representing energy content and a value representing a volume of flow of all or a portion of the gas comprising biomethane in step (i);

(iii) from the values measured in step (ii), obtaining a value representing energy delivered for the gas comprising biomethane in one or more time periods and recording a calculated value or values representing the energy delivered;

(iv) withdrawing or causing the withdrawal of an amount of natural gas from the pipeline system, said amount of withdrawn natural gas being withdrawn at one or more withdrawal locations in the pipeline system, wherein the withdrawn natural gas has an average heating value that is greater than the heating value for the gas comprising biomethane by at least about 925 BTU/cubic foot;

(v) measuring or causing a measurement of the volume of flow of the withdrawn natural gas at said one or more withdrawal locations in step (iv), wherein a value representing the volume of flow is recorded for the withdrawn natural gas at said one or more withdrawal locations, and the value of the energy delivered for the amount of withdrawn natural gas is at least equal to the value of the energy delivered for the gas comprising biomethane in step (iii);

(vi) using or causing the use of the withdrawn natural gas measured in step (vi) as a transportation fuel, or as a fuel intermediate or a feedstock to produce a transportation fuel; and (vii) generating a fuel credit.

According to a further exemplary aspect of the invention, there is provided a process for reducing greenhouse gas emissions associated with transportation fuel comprising:

(i) introducing a gas comprising biomethane to a pipeline system wherein the gas comprising biomethane has a heating value of less than about 925 BTU/cubic foot;

(ii) combining a first amount of the gas comprising biomethane having the heating value of less than about 925 BTU/cubic foot with a second amount of natural gas having a heating value that is greater than that of the gas comprising biomethane by at least about 50 BTU/cubic foot, said combining occurring at a combination point in the pipeline system to produce a mixed gas downstream of the combination point, said mixed gas having a heating value less than about 900 BTU/cubic foot;

(iii) measuring a value representing energy content and a value representing a volume of flow of all or a portion of the gas comprising biomethane in steps (i) or (ii);

(iv) from the values measured in step (iii), obtaining or recording a value representing energy delivered for the gas comprising biomethane in one or more time periods;

(v) withdrawing or causing the withdrawal of a third amount of natural gas from the pipeline system, said third amount of withdrawn natural gas being withdrawn at one or more locations in the pipeline system that are upstream of said combination point, wherein the withdrawn natural gas stream or streams have an average heating value that is greater than the heating value for the gas comprising biomethane by at least about 50 BTU/cubic foot;

(vi) measuring or causing a measurement of the volume of flow of the withdrawn natural gas at said one or more withdrawal locations in step (v), wherein a value representing the volume of flow is recorded for the withdrawn natural gas at said one or more withdrawal locations, and the energy delivered for the third amount of withdrawn natural gas is at least equal to the energy delivered for the gas comprising biomethane in step (iv);

(vii) using or causing the use of the withdrawn natural gas measured in step (vi) as a transportation fuel or a feedstock to produce a transportation fuel, said transportation fuel having a lifecycle greenhouse gas emissions reduction of at least 50% compared to a gasoline baseline.

According to a further exemplary aspect of the invention, there is provided a process for producing transportation fuel comprising:

(i) monitoring at least one of energy content and a volume of flow of gas comprising biomethane introduced into a pipeline system to obtain a value representing energy delivered from all or a portion of the gas comprising biomethane, said gas comprising biomethane having a first heating value below about 925 BTU/cubic foot and said pipeline system comprising natural gas having a second heating value such that the gas comprising biomethane is combined at a combination point with the natural gas having a second heating value that is at least about 50 BTU/cubic foot higher than the first heating value;

(ii) determining an amount of natural gas to be withdrawn from the pipeline system for use as a renewable transportation fuel, a feedstock to produce a renewable transportation fuel, or a combination thereof, said determining dependent on the energy delivered from all or a portion of the gas comprising biomethane introduced into the pipeline system, wherein the amount of natural gas to be withdrawn has an energy delivered that is at least equal to the energy delivered from the all or a portion of gas comprising biomethane introduced into the pipeline system;

(iii) selecting at least one outlet in the pipeline system from which the determined amount of natural gas is to be withdrawn such that the outlet is located upstream of the point at which the gas comprising biomethane is combined with the natural gas; and (iv) monitoring a volume of flow of the natural gas withdrawn from the pipeline system, wherein the gas withdrawn from the pipeline system has an average heating value that is greater than the first heating value by at least about 50 BTU/cubic foot and a fuel credit is generated using the energy delivered from the gas comprising biomethane of step (i) and the volume of flow monitored in step (iv).

According to a further exemplary aspect of the invention, there is provided a process for producing transportation fuel comprising:

(i) obtaining data from at least one meter measuring energy content and volume of flow of all or a portion of a gas comprising biomethane introduced into a pipeline system, said biomethane having a heating value below about 925 BTU/cubic foot, said pipeline system connected to at least one source of natural gas having a heating value of at least about 950 BTU/cubic foot;

(ii) obtaining data from at least one other meter measuring volume of flow of natural gas withdrawn from the pipeline system for use as a renewable transportation fuel, a feedstock for producing a renewable transportation fuel, or a combination thereof;

(iii) obtaining the energy delivered for the gas comprising biomethane and natural gas withdrawn from the pipeline system using the data in (i) and (ii); and (iv) determining one or more fuel credits to be generated or received using the data obtained in (i) and (ii), wherein the one or more fuel credits are determined from an amount of energy delivered from the gas comprising biomethane introduced into the pipeline system and an at least equal amount of energy delivered of natural gas withdrawn from the pipeline system and used for transportation fuel, wherein the gas comprising biomethane is introduced into the pipeline system at a first point such that it combines with natural gas to produce a mixed gas having a heating value lower than about 900 BTU/cubic foot, and wherein the natural gas withdrawn from the pipeline system for use as a renewable transportation fuel, a feedstock for producing a renewable transportation fuel, or a combination thereof, has a heating value that is greater than the heating value of the gas comprising biomethane introduced into the pipeline system by at least about 25 BTU/cubic foot and is withdrawn from a second point that is upstream of the first point.

According to a further exemplary aspect of the invention, there is provided a process for producing a transportation fuel comprising:

(i) introducing or causing the introduction of a first amount of gas comprising biomethane having a heating value of in the range of about 350 BTU/cubic foot to about 650 BTU/cubic foot into a pipeline system, said pipeline system connected to at least one source of natural gas having a heating value of at least about 950 BTU/cubic foot, wherein the gas comprising biomethane combines with natural gas to produce a mixed gas having a heating value less than about 750 BTU/cubic foot;

(ii) measuring or causing the measurement of a value representing energy content and a value representing a volume of flow of all or a portion of the gas comprising biomethane in step (i);

(iii) from the values measured in step (ii), obtaining a value representing energy delivered for the gas comprising biomethane in one or more time periods and recording a calculated value or values representing the energy delivered;

(iv) withdrawing or causing the withdrawal of an amount of natural gas from the pipeline system, said amount of withdrawn natural gas being withdrawn at one or more locations in the pipeline system, wherein the withdrawn natural gas has an average heating value that is greater than about 925 BTU/cubic foot;

(v) measuring or causing a measurement of the volume of flow of the withdrawn natural gas at said one or more withdrawal locations in step (iv), wherein a value representing the volume of flow is recorded for the withdrawn natural gas at said one or more withdrawal locations, and the energy delivered for the amount of withdrawn natural gas is at least equal to the energy delivered for the gas comprising biomethane in step (iii);

(vi) using or causing the use of the withdrawn natural gas measured in step (v) as a transportation fuel, or as a fuel intermediate or a feedstock to produce a transportation fuel; and generating a fuel credit in association with such transportation fuel.

According to a further exemplary aspect of the invention, there is provided a process for producing a transportation fuel comprising:

(i) introducing a gas comprising biomethane to a pipeline system wherein the gas comprising biomethane has a heating value of 350-925 BTU/cubic foot;

(ii) combining a first amount of the gas comprising biomethane having the heating value of 350-925 BTU/cubic foot with a second amount of natural gas having a heating value of at least 950 BTU/cubic foot, said combining occurring at a combination point in the pipeline system to produce a mixed gas downstream of the combination point;

(iii) measuring a value representing energy content and a value representing a volume of flow of all or a portion of the the gas comprising biomethane in steps (i) or (ii);

(iv) from the values measured in step (iii), obtaining a value representing energy delivered for the gas comprising biomethane in one or more time periods and recording a calculated value or values representing the energy delivered;

(v) withdrawing or causing the withdrawal of a third amount of natural gas from the pipeline system, said third amount of withdrawn natural gas being withdrawn at one or more locations in the pipeline system that are upstream of said combination point, wherein the withdrawn natural gas stream or streams have an average heating value that is greater than the heating value for the gas comprising biomethane by at least 25 BTU/cubic foot;

(vi) measuring or causing a measurement of the volume of flow of the withdrawn natural gas at said one or more withdrawal locations in step (v), wherein a value representing the volume of flow is recorded for the withdrawn natural gas at said one or more withdrawal locations, and the energy delivered for the third amount of withdrawn natural gas is at least substantially equal to the energy delivered for the gas comprising biomethane in step (iv);

(vii) using or causing the use of the withdrawn natural gas measured in step (vi) as a transportation fuel, or as a fuel intermediate or a feedstock to produce a transportation fuel; and (viii) generating or causing the generation of a fuel credit.

According to a further exemplary aspect of the invention, there is provided a process for producing a transportation fuel comprising:

(i) introducing or causing the introduction of gas comprising biomethane having a heating value of 350-925 BTU/cubic foot into a pipeline system;

(ii) combining or causing the combination of a first amount of the gas comprising biomethane having the heating value of 350-925 BTU/cubic foot with a second amount of natural gas having a heating value of at least 950 BTU/cubic foot, said combining occurring at a combination point in the pipeline system to produce a mixed gas downstream of the combination point;

(iii) measuring or causing a measurement of a value representing energy content and a value representing a volume of flow of all or a portion of the gas comprising biomethane in steps (i) or (ii);

(iv) from the values measured in step (iii), obtaining a value representing energy delivered for the gas comprising biomethane in one or more time periods;

(v) withdrawing or causing the withdrawal of a third amount of natural gas from the pipeline system, said third amount of withdrawn natural gas being withdrawn at one or more locations in the pipeline system to which the mixed gas does not flow, wherein the withdrawn natural gas stream or streams have an average heating value that is greater than the heating value for the gas comprising biomethane by at least 25 BTU/cubic foot;

(vi) measuring or causing a measurement of the volume of flow of the withdrawn natural gas at said one or more withdrawal locations in step (v), wherein a value representing the volume of flow is recorded for the withdrawn natural gas at said one or more withdrawal locations, and the energy delivered for the third amount of withdrawn natural gas is at least substantially equal to the energy delivered for the gas comprising biomethane in step (iv);

(vii) using or causing the use of the withdrawn natural gas measured in step (vi) as a transportation fuel, or as a fuel intermediate or a feedstock to produce a transportation fuel; and (viii) generating a fuel credit.

According to a further exemplary aspect of the invention, there is provided a process for producing a transportation fuel comprising:

(i) introducing or causing the introduction of a first amount of gas comprising biomethane having a heating value of 350-925 BTU/cubic foot into a pipeline system or a pipeline connected to the pipeline system, wherein the pipeline system comprises natural gas having a heating value of at least 950 BTU/cubic foot;

(ii) measuring or causing the measurement of a value representing energy content and a value representing a volume of flow of all or a portion of the gas comprising biomethane in step (i);

(iii) from the values measured in step (ii), obtaining a value representing energy delivered for the gas comprising biomethane in one or more time periods and recording a calculated value or values representing the energy delivered;

(iv) withdrawing or causing the withdrawal of an amount of natural gas from the pipeline system, said amount of withdrawn natural gas being withdrawn at one or more locations in the pipeline system, wherein the withdrawn natural gas stream or streams have an average heating value that is greater than the heating value for the gas comprising biomethane by at least 25 BTU/cubic foot;

(v) measuring or causing a measurement of the volume of flow of the withdrawn natural gas at said one or more withdrawal locations in step (iv), wherein a value representing the volume of flow is recorded for the withdrawn natural gas at said one or more withdrawal locations, and the energy delivered for the amount of withdrawn natural gas is at least substantially equal to the energy delivered for the gas comprising biomethane in step (iii);

(vi) using or causing the use of the withdrawn natural gas measured in step (v) as a transportation fuel, or as a fuel intermediate or a feedstock to produce a transportation fuel; and (vii) generating a fuel credit.

According to a further exemplary aspect of the invention, there is provided a process for producing a transportation fuel comprising:

(i) introducing a gas comprising biomethane to a pipeline system wherein the gas comprising biomethane has a heating value of about 350-925 BTU/cubic foot;

(ii) combining a first amount of the gas comprising biomethane having the heating value of 350-925 BTU/cubic foot with a second amount of natural gas having a heating value of at least about 950 BTU/cubic foot, said combining occurring at a combination point in the pipeline system to produce a mixed gas downstream of the combination point;

(iii) measuring a value representing energy content and a value representing a volume of flow of all or a portion of the gas comprising biomethane in steps (i) or (ii);

(iv) from the values measured in step (iii), obtaining a value representing energy delivered for the gas comprising biomethane in one or more time periods and recording a calculated value or values representing the energy delivered;

(v) withdrawing or causing the withdrawal of a third amount of natural gas from the pipeline system, said third amount of withdrawn natural gas being withdrawn at one or more locations in the pipeline system that are upstream of said combination point, wherein the withdrawn natural gas stream or streams have an average heating value that is greater than the heating value for the gas comprising biomethane by at least about 25 BTU/cubic foot;

(vi) measuring or causing a measurement of the volume of flow of the withdrawn natural gas at said one or more withdrawal locations in step (v), wherein a value representing the volume of flow is recorded for the withdrawn natural gas at said one or more withdrawal locations, and the energy delivered for the third amount of withdrawn natural gas is at least substantially equal to the energy delivered for the gas comprising biomethane in step (iv);

(vii) using or causing the use of the withdrawn natural gas measured in step (vi) as a transportation fuel, or as a fuel intermediate or a feedstock to produce a transportation fuel; and (viii) generating or causing the generation of a fuel credit.

According to a further exemplary aspect of the invention, there is provided a process for producing a transportation fuel comprising:

(i) introducing or causing the introduction of gas comprising biomethane having a heating value of 350-925 BTU/cubic foot into a pipeline system;

(ii) combining or causing the combination of a first amount of the gas comprising biomethane having the heating value of 350-925 BTU/cubic foot with a second amount of natural gas having a heating value of at least about 950 BTU/cubic foot, said combining occurring at a combination point in the pipeline system to produce a mixed gas downstream of the combination point;

(iii) measuring or causing a measurement of a value representing energy content and a value representing a volume of flow of all or a portion of the gas comprising biomethane in steps (i) or (ii);

(iv) from the values measured in step (iii), obtaining a value representing energy delivered for the gas comprising biomethane in one or more time periods;

(v) withdrawing or causing the withdrawal of a third amount of natural gas from the pipeline system, said third amount of withdrawn natural gas being withdrawn at one or more locations in the pipeline system to which the mixed gas does not flow, wherein the withdrawn natural gas stream or streams have an average heating value that is greater than the heating value for the gas comprising biomethane by at least 25 BTU/cubic foot;

(vi) measuring or causing a measurement of the volume of flow of the withdrawn natural gas at said one or more withdrawal locations in step (v), wherein a value representing the volume of flow is recorded for the withdrawn natural gas at said one or more withdrawal locations, and the energy delivered for the third amount of withdrawn natural gas is at least substantially equal to the energy delivered for the gas comprising biomethane in step (iv);

(vii) using or causing the use of the withdrawn natural gas measured in step (vi) as a transportation fuel, or as a fuel intermediate or a feedstock to produce a transportation fuel; and (viii) generating a fuel credit.

According to a further exemplary aspect of the invention, there is provided a process for producing a transportation fuel comprising:

(i) introducing or causing the introduction of a first amount of gas comprising biomethane having a heating value of 350-925 BTU/cubic foot into a pipeline system or a pipeline connected to the pipeline system, wherein the pipeline system comprises natural gas having a heating value of at least about 950 BTU/cubic foot;

(ii) measuring or causing the measurement of a value representing energy content and a value representing a volume of flow of all or a portion of the gas comprising biomethane in step (i);

(iii) from the values measured in step (ii), obtaining a value representing energy delivered for the gas comprising biomethane in one or more time periods and recording a calculated value or values representing the energy delivered;

(iv) withdrawing or causing the withdrawal of an amount of natural gas from the pipeline system, said amount of withdrawn natural gas being withdrawn at one or more locations in the pipeline system, wherein the withdrawn natural gas stream or streams have an average heating value that is greater than the heating value for the gas comprising biomethane by at least about 25 BTU/cubic foot;

(v) measuring or causing a measurement of the volume of flow of the withdrawn natural gas at said one or more withdrawal locations in step (iv), wherein a value representing the volume of flow is recorded for the withdrawn natural gas at said one or more withdrawal locations, and the energy delivered for the amount of withdrawn natural gas is at least substantially equal to the energy delivered for the gas comprising biomethane in step (iii);

(vi) using or causing the use of the withdrawn natural gas measured in step (vi) as a transportation fuel, or as a fuel intermediate or a feedstock to produce a transportation fuel; and (vii) generating a fuel credit.

According to embodiments of one aspect of the invention, there is provided a process for producing a transportation or heating fuel comprising: (i) providing a gas comprising biomethane produced by anaerobic digestion that has a heating value of about 350-925 BTU/cubic foot; (ii) introducing the gas comprising biomethane having the heating value of about 350-925 BTU/cubic foot to a pipeline at a biomethane introduction point that is downstream of natural gas flowing in the pipeline, thereby producing a mixed gas flow downstream of the biomethane introduction point, and at least a portion of a mixed gas downstream of the biomethane introduction point is provided for use to generate heat, electricity or a combination thereof; (iii) measuring an energy content and a value representing a volume of flow of the gas comprising biomethane introduced to the pipeline in step (ii); (iv) from the values measured in step (iii), calculating a value representing energy delivered for the gas comprising biomethane in one or more time periods and recording a calculated value or values representing the calculated energy delivered; (v) withdrawing or causing the withdrawal of an amount of natural gas at a withdrawal location or locations upstream of the biomethane introduction point and that is connected to the biomethane introduction point of step (ii), which withdrawn natural gas has an average heating value greater than the gas comprising biomethane by at least about 25 BTU/cubic foot and has an energy delivered that is at least substantially equal to the energy delivered for the gas comprising biomethane in step (iii); (vi) measuring or causing a measurement of the volume of flow of the natural gas withdrawn at the withdrawal location or locations in step (v) and recording a value or values representing the volume of flow; (vii) transferring or causing a transfer of title of the gas comprising biomethane introduced in step (ii) to a user that withdraws or causes withdrawal of the natural gas at the upstream location using data from steps (iii), (iv) and/or (vi); and (viii) generating or causing the generation of a fuel credit at least in part due to the gas introduced in step (ii) and/or the natural gas withdrawn in step (v) or a fuel derived therefrom.

According to embodiments of a further aspect of the invention, there is provided a process for producing a transportation fuel comprising: (i) providing a gas comprising biomethane produced by anaerobic digestion that has a heating value of about 350-925 BTU/cubic foot; (ii) introducing the gas comprising biomethane having the heating value of about 350-925 BTU/cubic foot to a pipeline at a biomethane introduction point that is downstream of natural gas flowing in the pipeline, thereby producing a mixed gas flow downstream of the biomethane introduction point, and at least a portion of a mixed gas downstream of the biomethane introduction point is provided for use to generate heat, electricity or a combination thereof; (iii) withdrawing or causing the withdrawal of at least a substantially equal amount of natural gas as was introduced in step (ii) from the pipeline at a withdrawal location or locations upstream of the biomethane introduction point and that is connected to the biomethane introduction point of step (ii), which withdrawn natural gas has an average heating value greater than the gas comprising biomethane by at least about 25 BTU/cubic foot; (iv) transferring or causing a transfer of title of the gas comprising biomethane introduced in step (ii) to a user that withdraws or causes withdrawal of the natural gas at the withdrawal location or locations of step (iii); and (v) generating or causing the generation of a fuel credit at least in part due to the gas introduced in step (ii) and/or the natural gas withdrawn in step (iii) or a fuel derived therefrom.

According to embodiments of another aspect of the invention, there is provided a process for producing a transportation fuel comprising: (i) providing a gas comprising biomethane produced by anaerobic digestion that has a heating value that is below pipeline specifications; (ii) introducing the gas comprising biomethane to a pipeline at a biomethane introduction point that is downstream of natural gas flowing in the pipeline, thereby producing a mixed gas flow downstream of the biomethane introduction point, and at least a portion of a mixed gas withdrawn downstream of the biomethane introduction point is provided for use to generate heat, electricity or a combination thereof; (iii) withdrawing or causing the withdrawal of at least a substantially equal amount of natural gas as was introduced in step (ii) from the pipeline at a location or locations upstream of the biomethane introduction point and that is connected to the biomethane introduction point of step (ii), which withdrawn natural gas has an average heating value greater than the gas comprising biomethane by at least about 50 BTU/cubic foot; (iv) transferring or causing a transfer of title of the gas comprising biomethane introduced in step (ii) to a user that withdraws or causes withdrawal of the natural gas at the upstream location of step (iii); and (v) generating or causing the generation of a fuel credit at least in part due to the gas introduced in step (ii) and/or the natural gas withdrawn in step (iii) or a fuel derived therefrom.

According to embodiments of a further aspect of the invention, there is provided a process for producing a transportation fuel comprising: (i) providing a gas comprising biomethane produced by anaerobic digestion that has a heating value of about 350-900 BTU/cubic foot; (ii) introducing the gas comprising biomethane having the heating value of about 350-900 BTU/cubic foot to a pipeline at a biomethane introduction point that is downstream of natural gas flowing in the pipeline having a heating value of at least about 940 BTU/cubic foot, thereby producing a mixed gas flow downstream of the biomethane introduction point, and at least a portion a mixed gas downstream of the biomethane introduction point location is provided for use to generate heat, electricity or a combination thereof; (iii) measuring an energy content and a value representing a volume of flow of the gas comprising biomethane introduced to the pipeline in step (ii); (iv) from the values measured in step (iii), calculating a value representing energy delivered for the gas comprising biomethane in one or more time periods and recording a calculated value or values representing the calculated energy delivered; (v) withdrawing or causing the withdrawal of at least a substantially equal amount of natural gas as was introduced in step (ii) from the pipeline at a withdrawal location or locations upstream of the biomethane introduction point and that is connected to the biomethane introduction point of step (ii), which withdrawn natural gas has a heating value greater than the gas comprising biomethane by at least about 75 BTU/cubic foot; (vi) measuring or causing a measurement of the volume of flow of the natural gas withdrawn in step (v) and recording a value or values representing the volume of flow; (vii) transferring or causing a transfer of title of the gas comprising biomethane introduced in step (ii) to a user that withdraws or causes withdrawal of the natural gas at the upstream withdrawal location or locations using data from steps (iii), (iv) and (vi), wherein the natural gas is for use as compressed natural gas or liquefied natural gas; and (ix) generating or causing the generation of a RIN fuel credit at least in part due to the gas introduced in step (ii) and the natural gas withdrawn in step (v) or a fuel derived therefrom.

According to embodiments of another aspect of the invention, there is provided a process for producing a transportation fuel comprising: (i) providing a gas comprising biomethane produced by anaerobic digestion that has a heating value of about 350-925 BTU/cubic foot; (ii) combining the gas comprising biomethane having the heating value of about 350-925 BTU/cubic foot in a pipeline system at a biomethane introduction point with natural gas having a heating value of at least about 950 BTU/cubic foot, thereby producing a mixed gas downstream of the biomethane introduction point, and at least a portion of a mixed gas downstream of the biomethane introduction point is provided for use to generate heat, electricity or a combination thereof; (iii) measuring a value representing energy content and a value representing a volume of flow of the gas comprising biomethane introduced to the pipeline system in step (ii); (iv) from the values measured in step (iii), calculating a value representing energy delivered for the gas comprising biomethane in one or more time periods and recording a calculated value or values representing the calculated energy delivered; (v) withdrawing or causing the withdrawal of an amount of natural gas from the pipeline system at one or more locations upstream of the biomethane introduction point, which withdrawn natural gas has an average heating value greater than the gas comprising biomethane by at least about 25 BTU/cubic foot; (vi) measuring or causing a measurement of the volume of flow of the natural gas withdrawn in step (v) and recording a value or values representing the volume of flow at the one or more locations in step (v) and the energy delivered for the natural gas withdrawn in step (v) is at least substantially equal to the energy delivered for the gas comprising biomethane in step (iv); (vii) using or causing the use of natural gas measured in step (vi) as a transportation fuel, or as a fuel intermediate or a feedstock to produce a transportation fuel; and (viii) generating or causing the generation of a fuel credit.

According to embodiments of a further aspect of the invention, there is provided a process for producing a transportation fuel comprising: (i) providing a gas comprising biomethane produced by anaerobic digestion that has a heating value of about 350-925 BTU/cubic foot; (ii) combining the gas comprising biomethane having the heating value of about 350-925 BTU/cubic foot in a pipeline system at a biomethane introduction point with natural gas having a heating value of at least about 950 BTU/cubic foot, thereby producing a mixed gas downstream of the biomethane introduction point, and at least a portion of a mixed gas downstream of the biomethane introduction point is provided for use to generate heat, electricity or a combination thereof; (iii) withdrawing or causing the withdrawal of an amount of natural gas from the pipeline system at one or more locations upstream of the biomethane introduction point, which withdrawn natural gas has a heating value greater than the gas comprising biomethane by at least about 25 BTU/cubic foot and a measured amount of energy delivered for the natural gas withdrawn at the one or more locations is at least substantially equal to a measured amount of energy delivered for the gas comprising biomethane in step (ii); (iv) using or causing the use of natural gas withdrawn in step (iii) as a transportation fuel, as a fuel intermediate or a feedstock to produce a transportation fuel; and (v) generating or causing the generation of a fuel credit.

According to embodiments of a further aspect of the invention, there is provided a process for producing a transportation fuel comprising: (i) providing a gas comprising biomethane produced by anaerobic digestion that has a heating value that is below pipeline specifications; (ii) combining the gas comprising biomethane in a pipeline system at a biomethane introduction point with natural gas having a heating value of at least about 950 BTU/cubic foot, thereby producing a mixed gas downstream of the biomethane introduction point, and at least a portion of a mixed gas downstream of the combination point is provided for use to generate heat, electricity or a combination thereof; (iii) withdrawing or causing the withdrawal of an amount of natural gas from the pipeline system at one or more locations upstream of the biomethane introduction point, which withdrawn natural gas has a heating value greater than the gas comprising biomethane by at least about 50 BTU/cubic foot and a total measured amount of energy delivered for the natural gas withdrawn at the one or more locations is at least substantially equal to a measured amount of energy delivered for the gas comprising biomethane combined with natural gas in step (ii); (iv) using or causing the use of natural gas withdrawn in step (iii) as a transportation fuel, or as a fuel intermediate or a feedstock to produce a transportation fuel; and (v) generating or causing the generation of a fuel credit.

According to embodiments of a further aspect of the invention, there is provided a process for producing a transportation fuel comprising: (i) providing a gas comprising biomethane produced by anaerobic digestion that has a heating value of about 350-925 BTU/cubic foot; (ii) combining a first amount of the gas comprising biomethane having the heating value of about 350-925 BTU/cubic foot with a second amount of natural gas having a heating value of at least about 950 BTU/cubic foot, said combining occurring at a combination point in a pipeline system to produce a mixed gas downstream of the combination point; (iii) measuring a value representing energy content and a value representing a volume of flow of the gas comprising biomethane in step (ii); (iv) from the values measured in step (iii), calculating a value representing energy delivered for said gas comprising biomethane in one or more time periods and recording a calculated value or values representing the energy delivered; (v) withdrawing or causing the withdrawal of a third amount of natural gas from the pipeline system, said third amount of withdrawn natural gas being withdrawn at one or more locations in the pipeline system that are upstream of said combination point, wherein a withdrawn natural gas stream or streams have an average heating value that is greater than the gas comprising biomethane by at least about 25 BTU/cubic foot; (vi) measuring or causing a measurement of the volume of flow of the natural gas withdrawn at each withdrawal location in step (v), wherein a value of values representing the volume of flow is recorded for the withdrawn natural gas at each withdrawal location, and the energy delivered for the third amount of withdrawn natural gas is at least substantially equal to the energy delivered for the gas comprising biomethane in step (iv); (vii) using or causing the use of the withdrawn natural gas measured in step (vi) as a transportation fuel, or as a fuel intermediate or a feedstock to produce a transportation fuel; and (viii) generating or causing the generation of a fuel credit.

In an embodiment of any one of the foregoing aspects of the invention, a fuel credit is generated or caused to be generated at least in part due to the energy delivered for the gas comprising biomethane. In a further embodiment, a fuel credit is transferred to the natural gas that is used as a transportation fuel, or a transportation fuel resulting from the natural gas.

In further embodiments of any of the foregoing aspects of the invention, the fuel credit is due at least in part to a transfer of GHG emission attributes from the gas comprising biomethane to said one or more upstream withdrawal locations in the pipeline system or to a user or intermediary that obtains such withdrawn natural gas, and the transfer is effected by data representing energy delivered for the gas comprising biomethane and the withdrawn gas as determined above.

According to embodiments of a further aspect of the invention, there is provided a process for producing a transportation fuel comprising: (i) providing a gas comprising biomethane produced by anaerobic digestion that has a heating value of about 350-900 BTU/cubic foot; (ii) combining the gas comprising biomethane having the heating value of about 350-900 BTU/cubic foot in a pipeline system at a biomethane introduction point with natural gas having a heating value of at least about 940 BTU/cubic foot, thereby producing a mixed gas downstream of the biomethane introduction point, and at least a portion of a mixed gas downstream of the combination point is provided for use to generate heat, electricity or a combination thereof; (iii) measuring a value representing an energy content and a value representing a volume of flow of the gas comprising biomethane introduced to the pipeline system in step (ii); (iv) from the values measured in step (iii), calculating a value representing energy delivered for the gas comprising biomethane in one or more time periods and recording a calculated value or values representing the energy delivered; (v) withdrawing or causing the withdrawal of an amount of natural gas from the pipeline system at one or more locations upstream of the biomethane introduction point, which withdrawn natural gas has a heating value greater than the gas comprising biomethane by at least about 75 BTU/cubic foot; (vi) measuring or causing a measurement of the volume of flow of the natural gas withdrawn at the one or more locations in step (v) and recording a value or values representing the volume of flow; and (vii) transferring or causing a transfer of the GHG emissions of the gas comprising biomethane introduced in step (ii) to a user that withdraws or causes withdrawal of the natural gas at the upstream location or to a geographical location where the natural gas is withdrawn and wherein the natural gas is for use as compressed natural gas or liquefied natural gas transportation fuel or as a fuel intermediate or feedstock for producing such transportation fuel, wherein the transfer comprises using data representing energy delivered for the gas comprising biomethane and the withdrawn natural gas as determined from steps (iii), (iv) and (vi), and wherein such transfer enables fuel credit generation.

BRIEF DESCRIPTION OF THE DRAWINGS

FIG. 1 is a drawing schematically depicting a pipeline system showing the input of a gas comprising biomethane at a biomethane injection point and withdrawal of natural gas from one or more upstream locations on the pipeline system.

DETAILED DESCRIPTION OF THE PREFERRED EMBODIMENTS

Feedstock

The feedstock used for producing the gas comprising biomethane is "non-fossil organic material" or simply "organic material" and refers to a material comprising carbon from one or more biologic sources that is not obtained from underground geologic formations. Any suitable non-fossil, biologic source material obtained or derived directly or indirectly from plants or animals can be used as the organic material in embodiments of the process of the invention to provide a carbon and/or energy source. This includes plant derived organic material comprising polysaccharides, including starch, cellulose and hemicellulose, oligosaccharides, disaccharides, monosaccharides, or a combination thereof. Other biologic, non-fossil source material that can be utilized as a carbon and/or energy source includes compounds or molecules derived from non-sugar containing material, such as lignin and fats. The organic material may be in liquid form containing soluble components, solid form, gaseous form, or any combination thereof.

According to an embodiment of the invention, the organic material includes material comprising starches, sugars or other carbohydrates derived from sugar or starch crops. The sugar or starch crops may include, but are not limited to, corn, wheat, barley, rye, sorghum, rice, potato, cassava, sugar beet, sugar cane, or a combination thereof.

The non-fossil organic material may also be biomass or biomass derived material. Examples of biomass and biomass derived material include (i) energy crops; (ii) residues, byproducts or waste from the processing of plant material in a facility, or feedstock derived therefrom; (iii) agricultural residues; (iv) forestry material; (v) material derived from pulp and paper processing; (vi) pulp and paper residues; (vii) municipal waste or components removed or derived from municipal waste; or (viii) a combination thereof. The biomass or biomass derived material can be in any form, including solid, liquid, gaseous form or a combination thereof.

Energy crops include biomass crops such as grasses, including C4 grasses, such as switch grass, energy cane, sorghum, cord grass, rye grass, miscanthus, reed canary grass, C3 grasses such as *Arundo donax* or a combination thereof.

Residues, byproducts or waste from the processing of plant material in a facility or feedstock derived therefrom include residues remaining after obtaining sugar from plant biomass such as sugar cane bagasse, sugar cane tops and/or leaves, beet pulp, or residues remaining after removing sugar from Jerusalem artichoke or residues remaining after grain processing, such as corn fiber, corn stover or bran from grains. Agricultural residues include, but are not limited to soybean stover, corn stover, rice straw, sugar cane tops and/or leaves, rice hulls, barley straw, corn cobs, wheat straw, canola straw, oat straw, oat hulls, or corn cobs. Agricultural residues could also be manure or residues from farming operations.

Forestry material includes any species of hardwood or softwood. The term includes residues, byproducts, waste or non-waste material from processing any hardwood or softwood species. Examples of waste include residues from sawmills, trimmings or slash from logging operations. Pulp and paper residue, includes non-pulp and non-paper products from chemical pulping or paper making such as black liquor, spent sulfite liquor, sludge, broke, fines or precipitated lignin.

Municipal waste includes post-consumer material or waste from a variety of sources, such as domestic, commercial, institutional and industrial sources. For example, the term includes refuse from waste collection, raw sewage and sewage sludge.

Biomass or biomass derived material can be a mixture of fibers that originate from different kinds of plant material, including mixtures of cellulosic and non-cellulosic biomass. In addition, the biomass may comprise fresh biomass, partially dried biomass, fully dried biomass, or a combination thereof. Moreover, new biomass varieties may be produced from any of those listed above by plant breeding or by genetic engineering.

Anaerobic Digestion

The gas comprising biomethane, also referred to as biogas is produced by anaerobic digestion. Anaerobic digestion is the biological breakdown of organic material by microorganisms under low oxygen conditions, or in the absence of oxygen, to produce a gas comprising biomethane, also referred to herein as biogas. As used herein, the anaerobic digestion encompasses any method for microbially digesting non-fossil organic material under anaerobic conditions. The digestion may or may not be contained within an anaerobic digester, as described further below. Without being limiting, anaerobic digestion may involve the decomposition of non-fossil organic material, including carbohydrates, fats and/or proteins therein, into simple sugars and glycerol. These compounds may then be converted to acids, which are then converted into methane by methanogenic bacteria or other microorganisms.

By "anaerobic digester", it is meant a tank, or other contained volume, such as a covered lagoon, designed to facilitate the breakdown of organic material in the aqueous stream by microorganisms under anaerobic or low oxygen conditions. The anaerobic digestion may be carried out in one or multiple anaerobic digesters connected in series, parallel or a combination thereof. Thus, the anaerobic digester may be one of a plurality of fluidly connected digesters.

An anaerobic digester utilized in accordance with embodiments of the invention may be designed and/or operated in a number of configurations including batch or continuous, mesophilic or thermophilic temperature ranges, and low, medium or high rates. The rate refers to the reduction (or digestion) of chemical oxygen demand (COD) per unit of volume to the unit, which is a rate measurement based on the removal of organic compounds present in the feed. In practice, the configuration utilized will depend on a number of factors. These may include consideration of the nature of the organic material in the aqueous stream to be treated and/or the level of treatment desired. Other factors that may be considered in the configuration choice include operating parameters such as residence time, temperature, pH and the nutrients supplied to a digester. Design choices also include provisions for handling or concentrating microbes, such as membranes, packing, settling and recycling.

The gas comprising biomethane utilized in the present invention is optionally derived from landfill waste. Landfill gas comprising biomethane may be produced by organic material decomposing under anaerobic conditions in a landfill. The waste is typically covered and mechanically compressed by the weight of the material that is deposited from above. This material limits oxygen exposure thus allowing anaerobic microbes to decompose the material by anaerobic digestion. By appropriately engineering a collection system at the landfill site, the resultant gas comprising biomethane is captured. Gas comprising biomethane can also be produced from organic material that is separated from waste that otherwise goes to landfills. According to further embodiments of the invention, the gas comprising biomethane is produced in an anaerobic digester at a landfill for digesting the waste.

Optional Partial Purification of the Gas Comprising Biomethane

The gas comprising biomethane is optionally treated prior to its introduction or combination with natural gas to a pipeline system to remove at least a portion of one or more impurities therefrom. Impurities in the gas comprising biomethane may include, without limitation, carbon dioxide, hydrogen sulfide, water, oxygen, nitrogen and/or halogenated compounds. The impurities in the crude biogas can be removed by any suitable method, or combination of methods, to yield a partially purified gas comprising biomethane. In one embodiment of the invention, at least carbon dioxide is removed from the crude biogas, although other impurities can optionally be removed as well.

The degree of removal of the one or more impurities is at a level less than that required to meet pipeline specifications or to produce a gas having a heating value less than 950 BTU/cubic foot. For example, between about 20% and about 95% of the carbon dioxide may be removed by weight from crude biogas (wt:wt). Examples of techniques for impurity removal include known techniques such as water or solvent scrubbing, pressure swing absorption and/or membrane separation.

Carbon dioxide removal from the crude biogas may be carried out by scrubbing techniques such as water or polyethylene glycol scrubbing, which typically involve flowing biogas through a column with a water or polyethylene glycol solution flowing counter-current to the biogas. Carbon dioxide is removed from the crude biogas by these techniques since it is more soluble in water or polyethylene glycol than methane.

A further technique for carbon dioxide removal from the crude biogas is pressure swing absorption, which utilizes adsorptive materials, such as zeolites and activated carbon that preferentially adsorb carbon dioxide at high pressure. When the pressure is released, the carbon dioxide desorbs.

Membrane separation is another technique that can be used to remove carbon dioxide from the crude biogas. Membrane separation may include high pressure gas separation or gas-liquid absorption membranes.

According to further embodiments of the invention, removal of hydrogen sulfide from the crude biogas is carried out by bacteria, such as chemotrophic thiobacteria that are capable of oxidizing hydrogen sulfide and using carbon dioxide as a carbon source. Bacterial removal of hydrogen sulfide may be carried out in an anaerobic digester or a storage tank. The addition of oxygen into a digester or storage tank promotes the growth of indigenous thiobacteria. In further exemplary embodiments, removal of hydrogen sulfide by bacteria is combined with water scrubbing. Another method for removing hydrogen sulfide is the addition of iron chloride to an anaerobic digester. The iron chloride reacts with hydrogen sulfide that is produced to form iron sulfide salt. Other non-limiting examples of techniques that can be utilized to remove hydrogen sulfide include the addition of iron oxide to a digester, which reacts with hydrogen sulfide to produce iron sulfide, pressure swing absorption, water scrubbing, polyethylene glycol scrubbing and sodium hydroxide scrubbing. Another method for removing hydrogen sulfide involves adsorption by a compound such as activated carbon, a zeolite or other compound that preferentially removes sulfur components from methane.

Halogenated hydrocarbons can be removed by contacting the gas comprising biomethane with activated carbon. Oxygen and nitrogen impurities can be removed by membranes or pressure swing adsorption.

Combining a Gas Comprising Biomethane with Natural Gas

A first amount of a gas comprising biomethane having the heating value of about 350-925 BTU/cubic foot is combined in a pipeline system with natural gas, also referred to herein as a second amount of natural gas, having a heating value of at least about 950 BTU/cubic foot at a combination point in the pipeline system. This produces a mixed gas downstream of the combination point.

The gas comprising biomethane may have a heating value of less than about 950 BTU/cubic foot, more typically less than about 925 BTU/cubic foot or less than about 900 BTU/cubic foot. In other embodiments, the gas comprising biomethane has a heating value of less than 800 BTU/cubic foot, less than 700 BTU/cubic foot or less than 600 BTU/cubic foot. The gas comprising biomethane may be introduced to a natural gas pipeline system. Alternatively, natural gas may be introduced to a pipeline system comprising biogas. In either embodiment, the two gases are combined at a combination point which may include a biomethane introduction point. The combination produces a mixed gas downstream of the combination point.

The natural gas being combined may have a heating value greater than the gas comprising biomethane by at least about 25 BTU/cubic foot, at least about 50 BTU/cubic foot, at least about 75 BTU/cubic foot or at least about 100 BTU/cubic foot. In certain embodiments of the invention, the natural gas has a heating value of at least about 925 BTU/cubic foot, about 930 BTU/cubic foot, about 935 BTU/cubic foot, about 940 BTU/cubic foot, about 945 BTU/cubic foot or about 950 BTU/cubic foot. In certain embodiments, the natural gas has a heating value that is at least about 950 BTU/cubic foot prior to combination with the gas comprising biomethane, but immediately prior to the combination point, the heating value of the natural gas may be less than about 950 BTU/cubic foot due to the addition of dilute gas that may reduce the heating value of the natural gas prior to it being combined.

The gas comprising biomethane has a heating value that does not meet the specifications of a pipeline. Pipeline specifications for heating values are known and can be readily determined from published values for a particular pipeline. The heating value may be a measured daily average. As described previously, since pipeline specifications can vary depending on the location on a pipeline, whether the heating value of the gas comprising biomethane is below pipeline specifications is measured at its introduction point or the combination point.

For purposes herein, a "pipeline system" is an interconnected network, e.g, physically connected, of pipes or a single pipeline connecting two points. To be connected, it does not require that there be only one pipeline; any point physically connected by gas carrying pipes is a part of a connected pipeline system. The pipeline may carry natural gas which flows through the pipeline in a particular direction. The direction of flow of the natural gas is generally from an area of high pressure to low pressure. Compressors may be used to generate a pressure difference to facilitate gas flow along the pipeline. The compressor may be in the form of a turbine that moves the natural gas along the pipeline by increasing its pressure and a pipeline may comprise a number of compressors to move the natural gas therethrough.

The term "gas" when used to refer to a gas comprising biomethane or natural gas is used in a qualitative sense and does not denote a particular thermodynamic state in which the composition exists. That is, as would be appreciated by those of skill in the art, the gas comprising biomethane or natural gas can be in any fluid form, such as a gaseous form, liquefied form or compressed. Introduction of the gas comprising biomethane to a pipeline system typically involves compressing the gas prior to its introduction thereto. Introduction of the gas comprising biomethane is generally carried out by injection as would be appreciated by those of the skill in the art.

The term "energy content" is a measure of energy density, the energy contained within a volume of gas. It could be in units of BTU/cubic foot or MJ/cubic meter. Heating value is one example of an energy content measurement. The heating value of the gas comprising biomethane is a high heating value per volume (cubic feet) as determined by International Organization for Standardization (ISO) test method 6976: 1995, Natural Gas—Calculation of calorific values, density, relative density and Wobbe index from composition. The heating value of the gas comprising biomethane may be between about 350 BTU/cubic foot and about 950 BTU/cubic foot, or between about 350 BTU/cubic foot and about 925 BTU/cubic foot, or between about 350 BTU/cubic foot and about 930 BTU/cubic foot, or between about 375 BTU/cubic foot and about 925 BTU/cubic foot, or between about 400 BTU/cubic foot and about 920 BTU/cubic foot, or between about 500 BTU/cubic foot and about 900 BTU/cubic foot. In further embodiments of the invention, the heating value of the gas comprising biomethane may be less than about 940 BTU/cubic foot, less than about 935 BTU/cubic foot, less than about 930 BTU/cubic foot or less than about 925 BTU/cubic foot.

At the combination point, the gas comprising biomethane becomes intermixed with methane that originates from fossil fuel or other sources. In certain embodiments of the invention in which the gas comprising biomethane is introduced to a natural gas pipeline system, the biomethane introduction point may be at a location that is different than the combination point. To illustrate such embodiment, and without being limiting, after its introduction to the pipeline system, the gas comprising biomethane may flow through the pipeline system, such as through a dedicated pipe for carrying the gas comprising biomethane, and then mix with the fossil methane at a separate combination point in the pipeline system downstream of the introduction point.

Since the gas comprising biomethane typically has a heating value of less than about 950 BTU/cubic foot, introduction of the gas comprising biomethane or its combination with natural gas at the combination point generally produces a mixed gas flow downstream of the biomethane introduction point or the combination point having a heating value less than about 950 BTU/cubic foot. Embodiments of the invention include the generation of a mixed gas having a heating value less than about 925 BTU/cubic foot. Other embodiments of the invention include the generation of a mixed gas having a heating value less than about 900 BTU/cubic foot, and yet in other embodiments the mixed gas has a heating value less than about 850 BTU/cubic foot, less than about 750 BTU/cubic foot, less than about 650 BTU/cubic foot or less than bout 550 BTU/cubic foot. These values can be converted to standard units of $MJ/m^3$ and $m^3$/time as required.

Embodiments of the invention include measuring the energy content and volume of flow of the gas comprising biomethane that is combined with the natural gas. Measurements of the energy content and volume of flow of the gas comprising biomethane may be performed at the combination point in certain embodiments of the invention or at the biomethane introduction point for other embodiments of the invention. The volume can be measured in cubic feet/time, such as in cubic feet/min or cubic feet/hr and the energy content can be a heating value measured in BTU/cubic feet. These values can be converted to standard units of $MJ/m^3$ and $m^3$/time as required.

The energy content and volume of the gas comprising biomethane can be measured using gas metering. For example, a gas meter may include a gas chromatogram to measure the constituents in the gas comprising biomethane, and subsequently from this information the energy content can be determined by known techniques. A commercial unit available on the market for carrying out such measurements is a Daniel® Danalyzer™ Model 500 Gas Chromatograph available from Emerson Process Management. Volume measurements per unit of time may be carried out with the same or a different gas meter that records a volume of flow with time using methods known to those of skill in the art. Meters for measuring energy content and volume of flow can be configured to send information digitally to a computer or computer network. Energy content and volume of flow of gas comprising biomethane introduced into the pipeline system may be monitored. For purposes herein, monitoring includes measuring energy content and/or volume of gas flow at a single time point or over a series of time points, and/or collecting or receiving data from the instrument or testing/measuring equipment used for such measurements. The volume of flow of natural gas withdrawn from the pipeline system may also be monitored.

After determining values representing the energy content and volume of flow, the energy delivered can be obtained from the product of these two values and multiplying by a time factor. The energy delivered is typically the amount of energy delivered to or from the pipeline system in a particular time period, or series of time periods (e.g., discreet increments of time), such as, without limitation weekly, monthly, quarterly or yearly intervals. The energy delivered within a particular time period or series of time periods, is then recorded in a suitable format, such as in a digital format. Energy delivered can apply to all or a portion of a gas flow.

For example, the following calculation could be carried out to determine the energy delivered in a particular time period:

Energy delivered(BTU)=Σ((energy content(BTU/cubic foot)*volume of flow(cubic feet/min))
*number of minutes Use of the Mixed Gas by a Downstream User The mixed gas produced downstream of the combination point or biomethane introduction point may be provided for use by a user that combusts the mixed gas to generate heat, electricity or a combination thereof. Embodiments of the invention further comprise withdrawing or causing withdrawal of at least a portion of the mixed gas downstream of the biomethane introduction point or combination point. The term "cause" or "causing", as used in the specification means to arrange or bring about a specific result (e.g., a withdrawal of mixed gas or in other instances a withdrawal of natural gas), either directly or indirectly, or to play a role in a series of activities through commercial arrangements such as a written agreement, verbal agreement or contract.

A user of the mixed gas withdrawn from the pipeline may combust the mixed gas, e.g., combine the mixed gas with air and burn the mixture comprising gas and air so produced to generate heat, electricity or a combination thereof. Optionally, the air may be purified to enrich its oxygen content. For example, the air enriched in oxygen content may then be combined with the mixed gas in an oxyfuel combustion process known to those of skill in the art. In preferred embodiments the user of the mixed gas is a different entity than the user of the natural gas withdrawn for use as a transportation fuel.

The mixture comprising biomethane and air may be fed to a boiler in which water or other fluid is heated. The heat produced from the burning of the mixed gas stream is transferred to boiler feed water to produce steam. The boiler may be a coil tube boiler, although other types of boilers may be used as well. The steam may be used to drive turbines to create electricity for on-site use and/or can be sold to the power grid. Alternatively, or in addition to electricity generation, the steam can be used to supply process heat needs within a facility. If the steam is used within the facility, the pressure may be reduced prior to its re-use in the process. The mixture comprising gas and air may be burned in an internal combustion engine to drive a generator and/or may be used to drive a gas turbine to drive a generator. The mixture comprising gas may also be fed to a combustion engine driving a generator.

Withdrawal of Natural Gas

The process further involves withdrawing or causing the withdrawal of an amount of natural gas, also optionally referred to herein as a third amount of natural gas, from the pipeline system at a location upstream of the combination point on the pipeline system. The third amount of natural gas may be withdrawn at one or more locations in the pipeline system.

The amount of natural gas withdrawn is at least substantially equal to the amount of gas comprising biomethane that is combined with the natural gas in the pipeline system or introduced into the pipeline at the introduction point. Reference to "amounts", e.g., amounts of natural gas, are in terms of energy delivered.

The energy content or heating value may be measured using BTU or joules for a given volume of the natural gas withdrawn. Alternatively, the energy content may be a known value. The energy delivered may be determined as described herein. When natural gas is withdrawn at more than one location in the pipeline system, heating values for each withdrawn natural gas stream or streams may be averaged to provide a heating value for the third amount of natural gas withdrawn from the pipeline system.

In some embodiments, the value of the energy delivered for the withdrawn natural gas is at least substantially equal to the value of the energy delivered for the gas comprising biomethane. By "substantially equal", it is meant that the value of the energy delivered that is associated with the amount of natural gas withdrawn does not substantially vary from the value of the energy delivered that is determined for the amount of gas comprising biomethane at the combination or introduction point, such as by not more than about 5%, than about 2%, than about 1% or than about 0.5%. In certain embodiments the amount of natural gas withdrawn from the pipeline system is at least equal to all or a portion of the amount of gas comprising biomethane that is introduced into the pipeline system. In such embodiments the energy delivered for the natural gas withdrawn and used for renewable transportation fuel or as a feedstock for producing renewable transportation fuel or a combination thereof is substantially equal to the energy delivered from the portion of gas comprising biomethane applied for fuel credit purposes.

The withdrawn natural gas may have a heating value or energy content of at least about 950 BTU/cubic foot. The heating value of the gas withdrawn is a high heating value per volume (e.g., cubic feet) as determined by International Organization for Standardization (ISO) test method 6976: 1995, Natural Gas—Calculation of calorific values, density, relative density and Wobbe index from composition. In certain embodiments the average heating value of the withdrawn natural gas is at least about 925 BTU/cubic foot. In other embodiments, the average heating value of the withdrawn natural gas is greater than the heating value for the gas comprising biomethane by at least about 25 BTU/cubic foot, at least about 50 BTU/cubic foot, or at least about 75 BTU/cubic foot.

Physical gas flow direction in a pipeline or system, particularly a pipeline comprised of a network, may or may not be aligned with the direction in which the environmental attributes of the gas are transferred. The transfer is made on a displacement basis, where transactions within a pipeline network involve a matching and balancing of inputs and outputs, and the direction of the physical flow of gas need not be considered. For purposes herein, whether a withdrawal point is upstream or downstream with respect to the combination point, the sole consideration is the direction of natural gas flow of the physical gas in the pipeline system at the combination point. To be considered upstream, the withdrawal point can be any point in the pipeline system that is connected via pipeline to the combination point and that is in the direction opposite to the direction of natural gas flow in the pipeline at the combination point, regardless of the direction of flow of gas at other points within the pipeline network or system. A reference herein to upstream of a given reference point in a pipeline refers to any connected points located on the pipeline system that are in a direction away from the reference point that is opposite to the flow of gas at the reference point. A reference herein to downstream of a given reference point in a pipeline refers to any connected points located on the pipeline that are in a direction away from the reference point that is the same direction as the flow of gas at the reference point.

Embodiments of the invention further comprise measuring or causing a measurement of the volume of flow of the natural gas withdrawn from the pipeline at the upstream location or locations and recording a value representing the volume or volumes. The volume of flow can be expressed in cubic feet/time or MJ/time, depending on the country. The volume of flow is recorded, typically in digital format. In embodiments where natural gas is withdrawn from the pipeline system at more than one location(s), the volume of flow of the natural gas withdrawn is measured or caused to be measured at each withdrawal location and a value representing the volume of flow is recorded for natural gas at each withdrawal location for use in calculating the energy delivered for the withdrawn natural gas. For purposes herein, calculating includes deducing or otherwise obtaining a value. Likewise, measuring can include deducing a value.

After obtaining values representing the energy content and volume of flow of the withdrawn natural gas, an amount of energy delivered with respect to the natural gas withdrawn can be obtained from the product of these two values and multiplying by a time factor. The energy content can be known or measured. The energy delivered is typically the amount of energy withdrawn from the pipeline system in a particular time period, or series of time periods (e.g., discrete increments of time), such as, without limitation weekly, monthly or quarterly intervals.

The amount of energy delivered for the withdrawn natural gas may be greater than the amount of energy delivered for the gas comprising biomethane introduced into or combined with the second amount of natural gas in the pipeline, to the extent that only a portion of the flow of natural gas withdrawn might be considered to have the environmental attributes of the gas comprising biomethane and thus considered natural gas to which title has been transferred. That is, at least a portion of energy delivered associated with the third amount of withdrawn natural gas may correspond or substantially correspond to the energy delivered for the first amount of gas comprising biomethane. The value of the fuel credit can be due at least in part to a transfer of environmental attributes from the gas comprising biomethane to the withdrawn natural gas used as a transportation fuel by calculating the value of the energy delivered for the gas comprising biomethane and the value of the energy delivered for the withdrawn natural gas and selecting the lower value.

Since gas in the pipeline system is fungible, the third amount of withdrawn natural gas need not contain the same molecules of methane as the biomethane at the combination point. As described below, displacement of fossil methane with the gas comprising biomethane may be considered to have occurred within the pipeline system itself. By tracking the flow rates and amount of energy delivered, in association with the gas comprising biomethane and the natural gas withdrawn from the pipeline system, as described herein, the environmental attributes will nonetheless be considered transferred to the withdrawn natural gas.

The energy content and volume of the natural gas can be measured using gas metering. As described above, a gas meter may include a gas chromatogram to measure the constituents in the natural gas, and then from this information the energy content of the amount of natural gas withdrawn can be determined by known techniques. Alternatively, the gas meter may measure flow only. The energy withdrawn from the pipeline within a particular time period or series of time periods is then recorded in a suitable format, such as in a digital format. Meters for measuring energy content and volume of flow can be configured to send information digitally to a computer or computer network.

Transfer of Title or Environmental Attributes

Once gas is in a pipeline system, its environmental attributes, can be transferred to a different location or user in the pipeline system. This may be evidenced by a contract or other commercial arrangement. This may or may not involve transfer of ownership. By transferring "environmental attributes", it is meant that the natural gas withdrawn upstream of the combination point is considered to have the GHG emission properties of the gas comprising biomethane, as can be readily determined by those of skill in the art. According to embodiments of the invention, inputs and outputs to the pipeline are tracked by flow meters and electronic recording.

The transfer of environmental attributes in the pipeline system may be evidenced by title transfer of the gas comprising biomethane to natural gas that is withdrawn from the pipeline system. Embodiments of the invention comprise transferring or causing a transfer of title of the gas comprising biomethane introduced to or combined with natural gas in the pipeline system to a user that withdraws or causes withdrawal of the natural gas or to an intermediary that provides natural gas to such user. The transfer of title may be carried out via written documentation including, but not limited to, a letter, memorandum, affidavit, form or submission to governmental authorities or a contract that states, commits, guarantees or otherwise indicates that the environmental attributes of the gas comprising biomethane are transferred to the user of the natural gas or natural gas location. In embodiments of the invention, the transfer of title may be carried out via a contract for the sale or use of a specific quantity of natural gas taken from the pipeline for use as a transportation fuel. Such contract may meet the standards of responsible government authorities for the generation of renewable fuel credits. The title transfer need not be a direct transfer of the biomethane introduced to the pipeline to the user of the natural gas withdrawn. That is, the title may be transferred one or more times before its transfer to a user of the natural gas withdrawn or an upstream location.

An electronic trading system may be used to evidence transfer of environmental attributes or title to the upstream user or location. For example, a transaction management system that tracks the introduction of the gas comprising biomethane and the withdrawal of natural gas from a pipeline could be used. Such transaction management system may be software that tracks ownership of gas introduced to the pipeline and gas withdrawn, which includes measurements of the amount of gas input and output from the pipeline, typically in energy delivered. As described, there may be one or more transfers of ownership along the pipeline before its ultimate transfer to an owner, and thus the transaction management system may track more than one transaction.

In embodiments of the invention, the environmental attributes associated with the gas comprising biomethane are transferred to a user of the natural gas withdrawn at the location where natural gas is withdrawn. Without being limiting, natural gas withdrawn from a pipeline may be considered renewably derived, taking into account the displacement of fossil derived natural gas in the pipeline by the gas comprising biomethane, regardless of the location where the displacement actually occurs. Under applicable regulations, certain criteria are typically required as well to establish the foregoing, particularly with respect to fuel credit generation. Examples of such criteria are detailed below.

The withdrawn natural gas is then used or processed to make transportation fuel. The transportation fuel includes liquid or compressed natural gas (also referred to as "LNG" and "CNG", respectively) for combustion in transportation vehicles.

The natural gas may also be used as an intermediate or a feedstock to produce another fuel. For example, the natural gas to which the environmental attributes have been transferred may be chemically reacted to produce renewable hydrogen, which in turn is used in a process to produce a renewable or partially renewable liquid transportation fuel. In certain embodiments, the renewable hydrogen may be combined with a crude oil derived liquid hydrocarbon so that it becomes incorporated into the hydrocarbon and ultimately becomes part of the liquid transportation fuel that is the product of the fuel production facility. (See, e.g., U.S. Pat. Nos. 8,753,843, 8,658,026 and 8,945,373). In embodiments of the invention, the withdrawn natural gas is used as a transportation fuel that has life cycle GHG emissions that are at least 20% less than the life cycle GHG emissions of a gasoline baseline using EPA methodology, preferably at least 50% or 60% less. In further embodiments where the withdrawn natural gas is used as a fuel intermediate or a feedstock to produce a transportation fuel, the transportation fuel, including that resulting from the fuel intermediate, has life cycle GHG emissions that are at least 20% less than the life cycle GHG emissions of a gasoline baseline, preferably at least 50% or 60% less, using EPA methodology.

A fuel credit may be generated or caused to be generated in practicing the invention. In certain embodiments of the invention, a generator of a fuel credit may cause the practice of one or more steps in the invention, for example the provision of gas comprising biomethane, the introduction of gas comprising biomethane into the pipeline system, the combination in the pipeline system of gas comprising biomethane with natural gas having a higher heating value than the gas comprising biomethane, the measuring, calculating and recording of energy content, volume of flow, energy delivered and the withdrawal of the natural gas from the pipeline system and use as a transportation fuel. Various fuel credits are described herein.

Meeting Renewable and Low Carbon Fuel Targets

Embodiments of the invention advantageously provide a methodology for meeting renewable fuel targets or mandates established by governments, including legislation and regulations for transportation fuel sold or introduced into commerce in the United States. Examples of such legislation include the Energy Independence and Security Act ("EISA") and California AB 32—The Global Warming Solutions Act, which respectively established an RFS and a Low Carbon Fuel Standard (LCFS). For example, under EISA, the mandated annual targets of renewable content in fuel are implemented through an RFS that uses tradable credits (called Renewable Identification Numbers, referred to herein as "RINs") to track and manage the production, distribution and use of renewable fuels for transportation or other purposes. Targets under the LCFS can be met by trading of credits generated from the use of fuels with a lower GHG emission value than the gasoline baseline.

As described above, a fuel credit may be generated or caused to be generated at least in part due to the energy delivered for the first amount of gas comprising biomethane in step (iv) or introduced into the pipeline system. A fuel credit can be generated despite that the third amount of natural gas that is withdrawn from the pipeline system may not necessarily contain molecules originating from the anaerobic digestion or gas comprising biomethane. By tracking the amount of natural gas withdrawn and the amount of gas comprising biomethane input from the pipeline system, in energy delivered such as MJ or BTU, the environmental attributes of the gas comprising biomethane are transferred to the natural gas and a fuel credit can be generated in association its ultimate use as a transportation fuel or as an intermediate or feedstock in the production of a transportation fuel. A downstream user can use the mixed gas in applications that do not require methane that is significantly purified. Thus, the processes disclosed herein enable valuable fuel credit generation with reduced capital cost. This can serve to potentially incentivize the use of biomethane and overcome some of the hurdles to its commercialization, such as expensive purification needed for its introduction to a pipeline system.

The environmental attributes of the gas comprising biomethane are transferred to the withdrawn natural gas and are related to the life cycle GHG emission reductions. To determine life cycle GHG emissions associated with a fuel, analyses are conducted to calculate the GHG emissions related to the production and use of the fuel throughout its life cycle. Life cycle GHG emissions include the aggregate quantity of GHG emissions related to the full life cycle of the transportation fuel, including all stages of fuel and feedstock production and distribution, from feedstock generation or extraction through the distribution and delivery and use of the finished fuel to the ultimate consumer. GHG emissions account for total net GHG emissions, both direct and indirect, associated with feedstock production and distribution, the fuel production and distribution and use.

Because many of the laws adopted differentiate the requirements for fuels based upon their net GHG emissions impacts, it is known to those skilled in the art that regulators have developed and/or adopted methods to analyze and characterize the expected net GHG emissions of fuel pathways. Thus, the life cycle GHG emissions are determined in accordance with prevailing rules and regulations.

Life cycle GHG emissions evaluations generally consider GHG emissions associated with each of:

(a) feedstock production and recovery, including the source of carbon in the feedstock, direct impacts such as chemical inputs, energy inputs, and emissions from the collection and recovery operations, and indirect impacts such as the impact of land use changes from incremental feedstock production;

(b) feedstock transport, including feedstock production and recovery and GHG emissions from feedstock transport including energy inputs and emissions from transport;

(c) fuel production, including chemical and energy inputs, emissions and byproducts from fuel production (including direct and indirect impacts); and (d) transport and storage of the fuel prior to use as a transportation or heating fuel, including chemical and energy inputs and emissions from transport and storage.

Examples of models to measure life cycle GHG emissions associated with the one or more products of the invention, include, but are not limited to:

(i) GREET Model—GHGs, Regulated Emissions, and Energy Use in Transportation, the spread-sheet analysis tool developed by Argonne National Laboratories;

(ii) FASOM Model—a partial equilibrium economic model of the U.S. forest and agricultural sectors developed by Texas A&M University;

(iii) FAPRI International Model—a worldwide agricultural sector economic model that was run by the Center for Agricultural and Rural Development ("CARD") at Iowa State University;

(iv) GTAP Model—the Global Trade Analysis Project model, a multi-region, multi-sector computable general equilibrium model that estimates changes in world agricultural production as well as multiple additional models; and (v) ISO (International Organization for Standardization) standards for GHG emissions accounting and verification—provides guidance for quantification, monitoring and reporting of activities intended to cause greenhouse gas (GHG) emission reductions or removal enhancements.

The life cycle GHG emissions or carbon intensity of the fuel is measured in carbon dioxide equivalents ($CO_2$eq). As would be understood by those of skill in the art, carbon dioxide equivalents are used to compare the emissions from various GHGs based upon their global warming potential (GWP), which is a conversion factor that varies depending on the gas. The carbon dioxide equivalent for a gas is derived by multiplying the amount of the gas by the associated GWP: grams of $CO_2$eq=((grams of a gas)*(GWP of the gas)).

The GWP conversion value used to determine g $CO_2$eq will depend on applicable regulations for calculating life cycle GHG emissions reductions. The GWP under EISA is 1, 21 and 310, respectively, for carbon dioxide, methane and nitrous oxide as set forth in Renewable Fuel Standard Program (RFS2) Regulatory Impact Analysis, February 2010, United States Environmental Protection Agency, EPA-420-R-10-006, pg. 13, of which the entire contents are incorporated herein by reference. Under California's LCFS, the GWP is 1, 25 and 298, respectively, for carbon dioxide, methane and nitrous oxide, as measured by the GREET model. It should be appreciated that GWP values can be readily calculated by those of skill in the art in accordance with regulations.

The unit of measure for carbon intensity or life cycle GHG emissions that may be used to quantify GHG emissions of the transportation fuel of the present invention is grams $CO_2$eq per MJ of energy in the fuel or grams $CO_2$eq per million British thermal units of energy in the fuel (MMBTU). The units used to measure life cycle GHG emissions will generally depend on applicable regulations. For example, under the EPA regulations, GHG emissions are measured in units of grams $CO_2$eq per million BTUs (MMBTU) of energy in the fuel. Under LCFS, GHG emissions are measured in units of grams $CO_2$eq per MJ of energy in the fuel and are referred to as carbon intensity or CI.

The term "credit", "renewable fuel credit" or "fuel credit" means any rights, credits, revenues, offsets, greenhouse gas rights or similar rights related to carbon credits, rights to any greenhouse gas emission reductions, carbon-related credits or equivalent arising from emission reduction trading or any quantifiable benefits (including recognition, award or allocation of credits, allowances, permits or other tangible rights), whether created from or through a governmental authority, a private contract or otherwise. According to one embodiment of the invention, the renewable fuel credit is a certificate, record, serial number or guarantee, in any form, including electronic, which evidences production of a quantity of fuel meeting certain life cycle GHG emission reductions relative to a baseline set by a government authority. Preferably, the baseline is a gasoline baseline. Non-limiting examples of credits include RINs and LCFS credits. In an embodiment of the invention, the credit is a RIN.

For example, a product of the invention could qualify for an advanced biofuel RIN under EISA having a D code of 3, 4, 5 or 7. In a further embodiment, a product of embodiments the invention is eligible for a RIN having a D code of 3 or 5. Under the LCFS, products for use as fuels with greater reductions in life cycle GHG emissions qualify for a greater number of credits having higher market value than fuels with lower reductions.

(i) Meeting Renewable Fuel Targets Under EISA

U.S. policymakers have introduced a combination of policies to support the production and consumption of biofuels, one of which includes the Renewable Fuel Standard (RFS). The RFS originated with the Energy Policy Act of 2005 (known as RFS1) and was expanded and extended by the EISA of 2007. The RFS expanded and extended under EISA is sometimes referred to as RFS2 or RFS as used herein.

Under the EISA, the RFS sets annual mandates for renewable fuels sold or introduced into commerce in the United States through 2022 for different categories of biofuels (see Table 2 below). There is an annually increasing schedule for minimum aggregate use of total renewable biofuel (comprised of conventional biofuels and advanced biofuels), total advanced biofuel (comprised of cellulosic biofuels, biomass-based diesel, and other advanced biofuels), cellulosic biofuel and bio-based diesel. The RFS mandates are prorated down to "obligated parties", including individual gasoline and diesel producers and/or importers, based on their annual production and/or imports.

Each year, obligated parties are required to meet their prorated share of the RFS mandates by accumulating credits known as RINs, either through blending designated quantities of different categories of biofuels, or by purchasing from others the RINs of the required biofuel categories.

The RIN system was created by the Environmental Protection Agency (EPA) to facilitate compliance with the RFS. Credits called RINs are used as a currency for credit trading and compliance. RINs are generated by producers and importers of renewable fuels and assigned to the volumes of renewable fuels transferred into the fuel pool. RINs are transferred with a fuel through the distribution system until they are separated from the fuel by parties who are entitled to make such separation (generally refiners, importers, or parties that blend renewable fuels into finished fuels). After separation, RINs may be used for RFS compliance, held for future compliance, or traded. There is a centralized trading system administered by the EPA to manage the recording and transfer of all RINs.

According to certain embodiments of the invention, a RIN may be characterized as numerical information. The RIN numbering system was in the format KYYYYCCCCFFFFF-BBBBBRRDSSSSSSSSEEEEEEEE where numbers are used to designate a code representing whether the RIN is separated from or attached to a specific volume (K), the calendar year of production or import (YYYY), Company ID (CCCC), Facility ID (FFFFF), Batch Number (BBBBB), a code for fuel equivalence value of the fuel (RR), a code for the renewable fuel category (D), the start of the RIN block (SSSSSSSS) and the end of the RIN block (EEEEEEEE). Under current regulations, a RIN contains much of the foregoing information and other information in the form of data elements that are introduced into a web-based system administered by the EPA known as the EPA Moderated Transaction System, or "EMTS". It should be appreciated, however, that the information required for RIN generation and/or the format of the information may change depending on prevailing regulations.

The D code of a RIN specifies the fuel type, feedstock and production process requirements and thus in certain embodiments of the invention the D code may be used to characterize the type of RIN, as described hereinafter. The D code of a RIN is assigned a value between 3 and 7 under current regulations. The value assigned depends on the fuel type, feedstock and production process requirements as described in Table 1 to 40 C.F.R. §80.1426. Examples of fuels assigned a D code of 3 to 7 under current regulations are provided below. These examples are for illustration purposes only and are not to be considered limiting to the invention.

TABLE 1

RIN D code examples

| D code | Category | Example of Fuel type |
|---|---|---|
| 3 | Cellulosic biofuel | Ethanol from cellulosic biomass from agricultural residues or CNG/LNG from biomethane |
| 4 | Biomass-based diesel | Biodiesel and renewable diesel from soy bean oil |
| 5 | Advanced biofuel | Ethanol from sugarcane |

TABLE 1-continued

RIN D code examples

| D code | Category | Example of Fuel type |
|---|---|---|
| 6 | Renewable fuel (conventional biofuel) | Ethanol from corn starch |
| 7 | Cellulosic diesel | Diesel from cellulosic biomass from agricultural residues |

As described previously, the RFS2 mandate volumes are set by four separate but nested category groups, namely renewable biofuel, advanced biofuel, cellulosic biofuel and biomass-based diesel. The requirements for each of the nested category groups are provided in Table 2. Renewable transportation fuels category can be satisfied with many fuel types including CNG and LNG from biomethane.

The nested category groups are differentiated by the D code of a RIN. To qualify as a total advanced biofuel, the D code assigned to the fuel is 3, 4, 5 or 7, while to qualify as cellulosic biofuel the D code assigned to the fuel is 3 or 7 (Table 2).

According to current regulations, each of the four nested category groups requires a performance threshold in terms of GHG reduction for the fuel type. In order to qualify as a renewable biofuel, a fuel is required to meet at least a 20% life cycle GHG emission reduction (or be exempt from this requirement), while advanced biofuel and biomass-based diesel are required to meet at least a 50% life cycle GHG emission reduction and cellulosic biofuels are required to meet at least a 60% life cycle GHG emission reduction, relative to a gasoline baseline. As well, each nested category group is subject to meeting certain feedstock criteria.

TABLE 2

Nested category groups under RFS2

| Nested category group | Fuel type | Life cycle GHG threshold reduction relative to gasoline baseline |
|---|---|---|
| Renewable biofuel | Conventional biofuels (D code 6) and advanced biofuels (D code 3, 4, 5 or 7) | 20% |
| Advanced biofuel | Cellulosic biofuels (D code 3 or 7), biomass-based diesel (D code 4 or 7), and other advanced biofuels (D code 5) | 50% |
| Cellulosic biofuels | Biofuel derived from cellulosic material (D code 3) and biodiesel derived cellulosic material (D code 7). | 60% |
| Biomass-based diesel | Conventional biodiesel (D code 4) or cellulosic diesel (D code 7) | 50% |

The RIN associated with one or more products obtained or derived from the process may be assigned a D code of 3, 4, 5 or 7, also referred to herein as a D3, D4, D5 and D7 RIN, respectively. According to certain embodiments, the RIN associated with the one or more products may be assigned a D code of 3 or 5. Under current regulations, this corresponds to cellulosic biofuel and advanced biofuel fuel types, which meet GHG emissions reductions of 60% and 50%, respectively, relative to a gasoline baseline.

According to some embodiments of the invention, the fuel credit is characterized as containing numerical information associated with the one or more products produced by the process of the invention for use as a transportation fuel. Thus, a party may generate a fuel credit comprising numerical information relating to one or more products of the process representing at least one parameter selected from (i) the type of transportation fuel; (ii) the year in which the product was produced; (iii) a registration number associated with the producer or importer; and (iv) serial number associated with a batch. In a further embodiment, at least two parameters or at least three parameters are selected from the foregoing list. These parameters relate to RIN generation, but a Low Carbon Fuel Standard (LCFS) credit may also require generation of numerical information pertaining to one or more of these parameters. The numerical information may also include one or more of the following parameters selected from: (i') a number identifying that the numerical information is assigned to a volume of the product, or separated; (ii') a registration number associated with the facility at which the product was produced or imported; (iii') a number representing a value related to an equivalence value of the product; (iv') a number representing a first-volume numerical information associated with a batch of the product; and (v') a number representing a last-volume numerical information associated with a batch of the product.

The RIN or numerical information described herein or portion thereof is provided to a government regulatory agency, including the EPA, in connection with generating a RIN. In some embodiments of the invention, the numerical information is also provided to a purchaser of the product produced by the invention. The numerical information described herein or portions thereof may be stored electronically in computer readable format.

The purchaser of the product for use as a transportation fuel may separate the RIN. As described above, separation of a RIN from a volume of the product for use as a transportation fuel, means termination of the assignment of the RIN to a volume of fuel. RIN separation is typically carried out by a fuel blender, importer or other obligated party. According to pre-2010 regulations, when a RIN is separated, the K code of the RIN is changed to 2.

Separation of RINs may be conducted in accordance with prevailing rules and regulations, as currently provided in 40 C.F.R. §80.1129 and 40 C.F.R. §80.1429. RINs generated in accordance with the invention may be separated and subsequently traded.

Under certain EPA regulations, the natural gas withdrawn from a pipeline system that includes the combination point, including a biomethane injection point, would be considered renewably derived. In certain embodiments, this takes into account the displacement of fossil derived natural gas in the pipeline system by the gas comprising biomethane introduced into the pipeline system at the introduction point or at the combination point. Without being limiting, in order to generate RINs, a party may show that (i) a contract or commercial arrangement exists for the sale and/or use of a quantity of natural gas withdrawn from the pipeline at the location typically upstream of the combination point or has obtained affidavits from one or more parties selling or using natural gas withdrawn at the upstream location that such contract or commercial arrangements exists; (ii) the quantity of natural gas withdrawn from the upstream location for which fuel credits were generated was sold for use as transportation fuel; (iii) the combination point and the upstream natural gas withdrawal point are on the same commercial distribution system, such as a pipeline system, and the combination and withdrawal points are connected (although the connection need not be direct as described above); (iv) the natural gas withdrawn from the pipeline for use as a transportation fuel is withdrawn in a manner and at a time consistent with the transport of methane gas between the combination point or the introduction point of the gas comprising biomethane and the upstream withdrawal of the natural gas; (v) the volume and heat content of gas comprising biomethane and the volume of natural gas withdrawn to make a transportation fuel are measured by gas metering, such as by continuous metering; and/or (vi) the amount of natural gas sold for use as a transportation fuel corresponds to the amount of fuel derived from the gas comprising biomethane.

The foregoing regulations concerning generation of RINs with respect to the gas comprising biomethane introduced to a commercial distribution system, such as a pipeline, are described in 40 C.F.R. §80.1426 of the current regulations under EISA.

Where such conditions are satisfied, liquid transportation fuel made using the natural gas withdrawn from a natural gas pipeline system may qualify for renewable fuel credits.

Certain information may be submitted to regulators by entities that produce transportation fuel from the natural gas withdrawn at the location upstream of the biomethane introduction or combination point or other entities as required. Such information may include contracts and/or affidavits that track the gas comprising biomethane from its source to the natural gas withdrawn for use as a transportation fuel. Other information such as a specific quantity of the natural gas used for transportation purposes, its heat content, percent efficiency of transfer and/or conversion factors may be submitted to a regulator as well.

Records that are kept for regulatory purposes may include (i) documentation pertaining to the sale of the natural gas for use as transportation fuel or to make process heat for producing a renewable fuel and transfer of title; (ii) documentation showing the volume and energy content of the natural gas for use as a transportation fuel that was delivered to a facility; (iii) documentation showing the volume and energy content of gas comprising biomethane; (iv) information showing that the natural gas was used for transportation purposes; and/or (v) certification such as compliance certification required under Title V of the Clean Air Act.

It should be understood that the regulations under EISA, including RIN requirements and the criteria for categorization of a fuel under a particular fuel category, such as life cycle GHG emission thresholds, are described herein in accordance with current regulations. By the term "EPA methodology" with reference to determining life cycle GHG emissions relative to a gasoline baseline, it is meant using life cycle GHG calculations using methods according to prevailing regulations as required by the EPA. Such calculations can be readily determined by those of skill in the art.

(ii) Low Carbon Fuel Standard (LCFS)

Embodiments of the present invention can provide a means for meeting low carbon fuel standards established by jurisdictions within the United States or other government authorities. The credit, which includes a certificate, may be associated with one or more products from the process, and represents or is proportional to the amount of life cycle GHG emissions reduced measured relative to a gasoline baseline. The life cycle GHG emissions under low carbon fuel standards are often referred to as carbon intensity or CI.

California's LCFS currently requires that all mixes of fuel that oil refineries and distributors sell in the Californian market meet in aggregate the established targets for GHG emissions reductions. California's LCFS requires increasing annual reductions in the average life cycle emissions of most transportation fuels, up to a reduction of at least 10% in the carbon intensity, which is a measure of the life cycle GHG emissions, by 2020. Targets can be met by trading of credits generated from the use of fuels with a lower GHG emission value than gasoline baseline. Similar legislation has been implemented by the province of British Columbia, Canada, the United Kingdom and by the European Union.

According to some embodiments of the invention, LCFS fuel credit generation comprises generating information associated with the one or more products produced by the process of the invention for use as a transportation fuel. A party may generate information relating to at least one parameter selected from (i) a reporting period; (ii) a fuel pathway code; (iii) transaction information, including type or date of a transaction; (iv) fuel production facility information; (v) fuel delivery methods; (vi) an amount of fuel used as a fossil fuel replacement, such as gasoline or diesel; and (vii) credits or deficits generated. In a further embodiment, information regarding at least two parameters, at least three parameters or at least four parameters is generated from the foregoing list.

British Columbia approved a Renewable and Low Carbon Fuel Requirements Act, which requires parties who manufacture or import the fuel into the province ensure that the renewable content and the average carbon intensity of the fuel they supply meets levels set by regulations. Fuel suppliers are required to submit annual reports regarding the renewable fuel content and carbon intensity of the transportation fuels they supply. The province allows transfers of GHG credits between fuel suppliers to provide flexibility in meeting the requirements of the regulation.

In the European Union, GHG emissions are regulated by a Fuel Quality Directive, 98/70/EC. In April 2009, Directive 2009/30/EC was adopted which revises the Fuel Quality Directive 98/70/EC. The revisions include a new element of legislation under Article 7a that requires fuel suppliers to reduce the GHG intensity of energy supplied for road transport (Low Carbon Fuel Standard). In particular, Article 7a specifies that this reduction should amount to at least 6% by 31 Dec. 2020, compared to the EU-average level of life cycle GHG emissions per unit of energy from fossil fuels in 2010. According to the Fuel Quality Directive, fuel/energy suppliers designated by member states of the European Union are required to report to designated authorities on: (a) the total volume of each type of fuel/energy supplied, indicating where the fuel/energy was purchased and its origin; and (b) the life cycle GHG emissions per unit of energy. The European Union has also promoted the use of biofuels through a Biofuel Directive (2003/30/EC), which mandates countries across the EU to displace certain percentages of transportation fuel with biofuels by target dates.

The United Kingdom has a Renewable Transport Fuel Obligation in which biofuel suppliers are required to report on the level of carbon savings and sustainability of the biofuels they supplied in order to receive Renewable Transport Fuel Certificates (RTFCs). Suppliers report on both the net GHG savings and the sustainability of the biofuels they supply according to the appropriate sustainability standards of the feedstocks from which they are produced and any potential indirect impacts of biofuel production, such as indirect land-use change or changes to food and other commodity prices that are beyond the control of individual suppliers. Suppliers that do not submit a report will not be eligible for RTFCs.

Certificates can be claimed when renewable fuels are supplied and fuel duty is paid on them. At the end of the obligation period, these certificates may be redeemed to the RTFO Administrator to demonstrate compliance. Certificates can be traded, therefore, if obligated suppliers do not have enough certificates at the end of an obligation period they have to "buy-out" the balance of their obligation by paying a buy-out price.

The present invention has been described with regard to one or more embodiments. However, it will be apparent to persons skilled in the art that a number of variations and modifications can be made without departing from the scope of the invention as defined in the claims.

Description of an Embodiment of the Invention

FIG. 1 shows a natural gas pipeline network 10 comprising various inputs 10a, 10b, 10c, 10d and 10e for natural gas introduction to the pipeline network 10. Natural gas introduced at inputs 10a, 10b, 10c, 10d and 10e is from fossil sources. The natural gas introduced to the pipeline at these inputs has been previously purified so that its heating value is 950 BTU/cubic foot or higher as required by pipeline specifications.

In this example of the invention, a gas comprising biomethane 14 is produced by a landfill (LF) 16. The gas comprising biomethane 14 has a heating value of 500 BTU/cubic foot. The gas comprising biomethane 14 produced in the landfill 16 is compressed and introduced to the pipeline network 10 at a biomethane introduction point 18. A meter 18a measures the energy content in BTU/cf and flow in cf/time of the gas comprising biomethane 14. The product of these two values represents the energy delivered in BTU. These values may also be measured in MJ/m$^3$ and m$^3$/time in countries outside the United States. Optionally, the gas comprising biomethane 14 is partially purified prior to its introduction to the pipeline at biomethane introduction point 18 to reach a heating value of 800 BTU/cubic foot. The biomethane introduction point 18 is downstream of natural gas flow in the pipeline that has an energy value of 950 BTU/cubic foot. The direction of flow of the natural gas in pipeline network 10 is shown by arrows 20a, 20b, 20c, 20e and 20f. The gas comprising biomethane 14 mixes with natural gas flowing in direction shown by 20f to produce a mixed gas flow 22 downstream of the biomethane introduction point 18 having a heating value less than 950 BTU/cubic foot. The mixed gas flow 22 passes through a valve 26 in an open position and a mixed gas flow 22a downstream of the valve 26 is withdrawn by a first off-specification user 24. When the valve 26 is closed, the mixed gas flow 22 flows in the direction of flow indicated by arrow 28 as mixed gas flow 22b to a second off-specification user 30. The first and second off-specification users 24 and/or 30 mix the mixed gas flow 22a or 22b with air, and combust the gaseous mixture to generate heat and/or electricity.

At least a substantially equal amount of natural gas as was introduced at biomethane introduction point 18 is withdrawn at a location or locations upstream of the biomethane introduction point 18 to produce a withdrawn natural gas stream 32. The upstream withdrawal location is shown as natural gas withdrawal point 34. It should be appreciated that natural gas can additionally be withdrawn from other upstream locations, such as indicated by arrow 20d for household use at location 40.

The natural gas in the stream 32 withdrawn at upstream natural gas withdrawal point 34, and optionally at other withdrawal points, has a heating value greater than 950 BTU/cubic foot and is suitable for use in internal combustion engines. A meter 34a measures the flow in cf/time of the natural gas withdrawn at withdrawal point 34. This value may also be measured in m$^3$/time in countries outside the United States. Optionally, the energy content of the natural gas is measured as well, although often the energy content of natural gas in a pipeline is a known value. The withdrawn natural gas stream 32 is compressed in a compression unit 36 to form compressed natural gas (CNG) 38 or liquefied to form LNG. The compressed natural gas 38 is used as a transportation fuel and fuel credits can be generated due to its use as a transportation fuel or as an intermediate or feedstock to produce another fuel as described.

Embodiments of the invention comprise transferring or causing a transfer of title of the gas comprising biomethane 14 introduced at biomethane introduction point 18 to a user that withdraws or causes withdrawal of the natural gas stream 32 at the upstream withdrawal point 34. In this example, the transfer of title is carried out via a contract for the sale or use of a specific quantity of natural gas taken from the pipeline 10 for use as a transportation fuel. Such contract may meet the standards of government authorities for the generation of renewable fuel credits, as described above.

Although a biomethane introduction point is described above, in which a gas comprising biomethane is introduced to a pipeline system that transports natural gas, natural gas may also be introduced to a pipeline that transports a gas comprising biomethane. In either case, the two gases are combined to produce the mixed gas flow 22 comprising biomethane and methane from other sources besides anaerobic digestion. This stream 22 has a heating value that is lower than that of the natural gas.

Those of ordinary skill will understand that the embodiments and examples discussed herein are non-limiting, and accordingly other configurations or variations of the above configurations, may be utilized in conformity with the present invention.

What is claimed is:

1. A process for reducing greenhouse gas emissions associated with a transportation fuel comprising:
  (i) introducing a gas comprising biomethane to a pipeline system wherein the gas comprising biomethane has a heating value of less than 925 BTU/cubic foot;
  (ii) combining a first amount of the gas comprising biomethane having the heating value of less than 925 BTU/cubic foot with a second amount of natural gas having a heating value that is greater than that of the gas comprising biomethane by at least 50 BTU/cubic foot, said combining occurring at a combination point in the pipeline system to produce a mixed gas downstream of the combination point, said mixed gas having a heating value less than 900 BTU/cubic foot;
  (iii) measuring a value representing energy content and a value representing a volume of flow of all or a portion of the gas comprising biomethane in steps (i) or (ii);
  (iv) from the values measured in step (iii), obtaining or recording a value representing energy delivered for the gas comprising biomethane in one or more time periods;
  (v) withdrawing or causing the withdrawal of a third amount of natural gas from the pipeline system, said third amount of withdrawn natural gas being withdrawn at one or more locations in the pipeline system that are upstream of said combination point, wherein the withdrawn natural gas stream or streams have an average heating value that is greater than the heating value for the gas comprising biomethane by at least 50 BTU/cubic foot;
  (vi) measuring or causing a measurement of the volume of flow of the withdrawn natural gas at said one or more withdrawal locations in step (v), wherein a value representing the volume of flow is recorded for the withdrawn natural gas at said one or more withdrawal locations, and the energy delivered for the third amount of withdrawn natural gas is at least equal to the energy delivered for the gas comprising biomethane in step (iv);

(vii) using or causing the use of the withdrawn natural gas measured in step (vi) as one of the transportation fuel and a feedstock to produce the transportation fuel, at least a portion of said transportation fuel associated with a lifecycle greenhouse gas emissions reduction of at least 50% compared to a gasoline baseline, said lifecycle greenhouse gas emissions reduction based at least in part on introducing the gas comprising biomethane to the pipeline system.

2. The process of claim 1, further comprising removing at least one impurity from the gas comprising biomethane before or subsequent to step (i) to produce partially purified biomethane having a heating value that is less than 700 BTU/cubic foot.

3. The process of claim 1, wherein step (vii) comprises using or causing the use of the withdrawn natural gas from step (vi) as a transportation fuel in a compressed natural gas or a liquid natural gas vehicle.

4. The process of claim 1, wherein the withdrawn natural gas in step (vii) is used or caused to be used in a process comprising converting the withdrawn natural gas to hydrogen and using said hydrogen to displace hydrogen that is combined with a crude oil derived liquid hydrocarbon to produce a liquid transportation fuel.

5. The process of claim 1, wherein the gas comprising biomethane comprises at least one impurity selected from the group consisting of carbon dioxide, hydrogen sulfide, water, oxygen, nitrogen and a halogenated compound.

6. The process of claim 1, further comprising providing the mixed gas to a third party who engages in the activity of generating heat, electricity or a combination thereof.

7. The process of claim 1, wherein the gas comprising biomethane has a heating value of 400-900 BTU/cubic foot.

8. The process of claim 1, wherein the mixed gas downstream of the combination point has a heating value of less than 850 BTU/cubic foot.

9. The process of claim 1, further comprising generating or causing the generation of a fuel credit that is a Renewable Identification Number (RIN) or a Low Carbon Fuel Standard (LCFS) credit.

10. The process of claim 1, further comprising transferring the environmental attributes of the first amount of the gas comprising biomethane to the third amount of withdrawn natural gas.

11. The process of claim 1, further comprising measuring the values in steps (iii) and (vi) by gas metering.

12. The process of claim 1, further comprising generating or causing the generation of a fuel credit that is a Renewable Identification Number (RIN) or Low Carbon Fuel Standard (LCFS) credit, wherein the value of the fuel credit is due at least in part to a transfer of the environmental attributes from the gas comprising biomethane to said one or more withdrawal locations in the pipeline system or to a user or intermediary that obtains such withdrawn natural gas, said transfer being effected by calculating the value of the energy delivered for the gas comprising biomethane as determined in step (iv) and the value of the energy delivered for the third amount of withdrawn natural gas as measured in step (vi) and selecting the lower value.

13. The process of claim 12, wherein the transfer is evidenced by a title transfer.

14. The process of claim 6, further comprising combusting or causing the combustion of the mixed gas with air.

15. A process for producing a transportation fuel comprising:
(i) introducing or causing the introduction of a first amount of gas comprising biomethane having a heating value in the range of 350 BTU/cubic foot to 650 BTU/cubic foot into a pipeline system, said pipeline system connected to at least one source of natural gas having a heating value of at least 950 BTU/cubic foot, wherein the gas comprising biomethane combines with natural gas to produce a mixed gas having a heating value less than 750 BTU/cubic foot;
(ii) measuring or causing the measurement of a value representing energy content and a value representing a volume of flow of all or a portion of the gas comprising biomethane in step (i);
(iii) from the values measured in step (ii), obtaining a value representing energy delivered for the gas comprising biomethane in one or more time periods and recording a calculated value or values representing the energy delivered;
(iv) withdrawing or causing the withdrawal of an amount of natural gas from the pipeline system, said amount of withdrawn natural gas being withdrawn at one or more locations in the pipeline system, wherein the withdrawn natural gas has an average heating value that is greater than 925 BTU/cubic foot;
(v) measuring or causing a measurement of the volume of flow of the withdrawn natural gas at said one or more withdrawal locations in step (iv), wherein a value representing the volume of flow is recorded for the withdrawn natural gas at said one or more withdrawal locations, and the energy delivered for the amount of withdrawn natural gas is at least equal to the energy delivered for the gas comprising biomethane in step (iii);
(vi) using or causing the use of the withdrawn natural gas measured in step (v) as one of the transportation fuel, a fuel intermediate for the transportation fuel, or a feedstock to produce the transportation fuel; and
(vii) generating a fuel credit in association with the transportation fuel, said fuel credit based at least in part on the introduction of the first amount of gas comprising biomethane into the pipeline system.

* * * * *